(12) United States Patent
Takagi

(10) Patent No.: US 7,468,725 B2
(45) Date of Patent: Dec. 23, 2008

(54) METHOD AND APPARATUS FOR DESCRIBING SOLID SHAPES, AND CAD/CAM SYSTEM WHICH EMPLOYS THE METHOD

(75) Inventor: Tarou Takagi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 233 days.

(21) Appl. No.: 10/806,182

(22) Filed: Mar. 23, 2004

(65) Prior Publication Data
US 2004/0174359 A1 Sep. 9, 2004

Related U.S. Application Data

(63) Continuation of application No. 10/239,058, filed as application No. PCT/JP00/06366 on Sep. 18, 2000, now Pat. No. 6,982,711.

(51) Int. Cl.
*G06T 15/00* (2006.01)
(52) U.S. Cl. .................. 345/420; 345/619; 717/105; 717/110; 717/115
(58) Field of Classification Search ................ 345/420, 345/418, 619; 717/105, 110, 113, 115
See application file for complete search history.

(56) References Cited

U.S. PATENT DOCUMENTS 5,757,375 A * 5/1998 Kawase ...................... 345/613
5,831,621 A * 11/1998 Pito ........................... 345/419
6,812,924 B2 * 11/2004 Kondo ........................ 345/420
6,889,374 B1 * 5/2005 Wainwright ................. 717/115
6,917,369 B2 * 7/2005 Perry et al. .................. 345/589
7,250,948 B2 * 7/2007 Hayes et al. ................. 345/421

FOREIGN PATENT DOCUMENTS

| JP | 5-120396 A | 5/1993 |
|---|---|---|
| JP | 05-197785 | 8/1993 |
| JP | 6-149991 A | 5/1994 |
| JP | 9-237354 A | 9/1997 |
| JP | 2000-182081 A | 6/2000 |
| JP | P2000-235409 A | 8/2000 |

* cited by examiner

*Primary Examiner*—Phu K Nguyen
(74) *Attorney, Agent, or Firm*—McDermott Will & Emery LLP

(57) ABSTRACT

Disclosed is a solid shape describing apparatus provided with a function for defining both absolute coordinate system and floating coordinate system, a function for describing a relationship between the absolute coordinate system and the floating coordinate system, a function for defining a three-dimensional cell array, a function for describing the correspondence between the floating coordinate system and the three-dimensional cell array, and a function for converting the three-dimensional cell array to a solid model.

2 Claims, 21 Drawing Sheets

(a) THREE-DIMENSIONAL BIT-MAP (b) SOLID SHAPE DESCRIBING METHOD
OF THE PRESENT INVENTION

COORDINATE PARAMETERS

| r | $\theta$ |
|---|---|

THREE-DIMENSIONAL CELL ARRAY

| 1 | 1 | 1 | 1 | 1 | 1 | 1 | 1 | 1 | 1 | ... | 1 | 1 | 1 |
|---|---|---|---|---|---|---|---|---|---|-----|---|---|---|
| 1 | 1 | 1 | 1 | 1 | 1 | 1 | 1 | 1 | 1 | ... | 1 | 1 | 1 |
| 1 | 1 | 1 | 1 | 1 | 1 | 1 | 1 | 1 | 1 | ... | 1 | 1 | 1 |
| 1 | 1 | 1 | 1 | 1 | 1 | 1 | 1 | 1 | 1 | ... | 1 | 1 | 1 |
| 1 | 1 | 1 | 1 | 1 | 1 | 1 | 1 | 1 | 1 | ... | 0 | 1 | 1 |
| 1 | 1 | 1 | 1 | 1 | 1 | 1 | 1 | 1 | 0 | ... | 0 | 0 | 0 |
| 0 | 0 | 0 | 1 | 1 | 1 | 1 | 1 | 0 | 0 | ... | 0 | 0 | 0 |
| 0 | 0 | 0 | 0 | 0 | 0 | 0 | 0 | 0 | 0 | ... | 0 | 0 | 0 |

COORDINATE CONVERSION FUNCTIONS

| $X(r, \theta) = r \cos \theta$ |
|---|

| $Y(r, \theta) = r \sin \theta$ |
|---|

SOLID SHAPE (a)

(b)
(b1)

(b2)

(c)

(b3)

(b4)

(d)

(e)

(a)

(b)

(a)

(b)

(c)

(a)

DFa (b)

DFb (a)

(b)

(a)

(b)

METHOD AND APPARATUS FOR DESCRIBING SOLID SHAPES, AND CAD/CAM SYSTEM WHICH EMPLOYS THE METHOD

This application is a continuation of application Ser. No. 10/239,058 filed Sep. 19, 2002 now U.S. Pat. No. 6,982,711, which is a 371 of PCT/JP00/06366, filed Sep. 18, 2000.

TECHNICAL FIELD

The present invention relates to a method and an apparatus for describing solid shapes and a CAD/CAM system which employs the method. More particularly, the present invention relates to a method and an apparatus for describing solid shapes preferred to describe, operate, and send free solid shapes, as well as a CAD/CAM system that employs the method.

BACKGROUND ART

There are many well-known solid shape data items used to describe solid shapes. "Solid model" and "surface model" among them are used most frequently. The "solid model" means solid shape data structured so that, when a solid body and a point are given, which of the inside, outside, and surface of the solid body includes the point can be determined by a certain procedure. On the other hand, the "surface model" does not have the data structure. A three-dimensional CAD/CAM system usually employs the "solid model", since the system must determine the mutual interference of solid bodies quickly. For example, the official gazettes of JP-A H8-335279 and JP-A H11-272733 disclose the methods for creating such solid models.

There are also some more well-known methods for creating solid models. The boundary representations (B-reps) is one of those methods. According to this method, vertices, edges, faces and solids are defined algebraically and the mutual topologies are defined so as to describe the target solid shape. The Constructive Solid Geometry (CSG) combines primitives, which are basic elements of a solid shape, thereby describing a complicated solid shape. A three-dimensional bit-map describes a solid shape by defining a grid in a three-dimensional space and it is defined which of the inside, outside, and surface of the three-dimensional space includes each of the areas (cells) divided by the grid.

Each of the above-described methods have merits and defects. Especially, the features of the three-dimensional map are different from those of the B-reps and the CSG. The merits and defects of those methods are as shown below.

The merits of both B-reps and CSG against the three-dimensional bit-map are as follows.
a. Generally, the data size is small.
b. Less calculations are required to process a shape.
c. Feature-related information (part of a shape) is available.
d. Data is exact geometrically.

The merits of the three-dimensional bit-map against both of B-reps and CSG are as follows:
e. The same data is always assumed for the same shape.
f. The data structure is not affected by slight deformation.
g. The data size is constant even for a complicated shape.

The defects of both B-reps and CSG against the three-dimensional bit-map are as follows:
e. The same data is not always assumed for the same shape.
f. The data structure might be changed significantly by slight deformation.
g. The data size is limitless for a complicated shape.

The defects of the 3-dimensional bit-map against both B-reps and CSG are as follows:
a. The data size usually becomes large.
b. Many calculations are required to process a shape.
c. No feature-related information (geometrical properties of a shape) is available.
d. Data is not so accurate geometrically. Translation is needed depending on the subject model.

For how to describe a solid model and the features of each of the methods, refer to the documents as "Computer Graphics" (J. D. Foley, A. Dam, S. K. Feiner, J. F. Hughes/Addition-Wesley Inc.), etc.

In any of the conventional 3-dimensional CAD systems, B-reps and CSG have been used for solid models. In recent years, however, the merits of the three-dimensional bit-map come to be recognized once again now that the computer performance has been improved significantly, free shape processing have become easier, free from designing has become possible, designs are of great account, and reverse engineering that creates solid shape data by measuring natural things and existing products has become wide-spread. Using such 3-dimensional bit-maps for designing a solid shape, therefore, enables a comparison to be made among a plurality of shapes, optimize a shape by repeating slight deformation for it, and record a real body as data through 3-dimensional measurements without requiring any special technique.

While a 3-dimensional bit-map has the above described (a to d) defects, the defects b and d are almost solved by the rapid progress of the computer processing ability. The defects a and c, however, have still remained as unsolved problems.

A data compression technique may be used to reduce the data size. Complicated data compression by the LZ method or the like, however, should be avoided, since the whole subject solid model data must be extended each time it is used. This makes it difficult to use the solid model. This is why there has been no choice for data compression but using a comparatively simple and partial data compression method such as the oct-tree method. Improvement of the compression rate has been difficult so far.

To provide a solid shape with feature-related information, for example, geometrical characteristics, as well as meaning, machining method, and accuracy of the solid shape, a method for adding solid shape data described using the B-reps and CSG methods to the subject solid shape has been used sometimes. This method, however, increases the data size and almost lose the merits e, f, and g of the 3-dimensional bit-map.

Any of the above conventional techniques, therefore, have not so effective to solve the defects of the 3-dimensional bit-map while the merits thereof are kept as are.

DISCLOSURE OF THE INVENTION

Under such circumstances, it is an object of the present invention to provide a solid shape describing method for describing solid models, which can reduce the solid shape data size and make each solid shape data include feature-related information while the merits of the three-dimensional bit-map, as well as an engineering system which employs the method. The above-described features of the three-dimensional bit-map are, for example, that the same data is always assumed for the same shape, the same data structure is kept at slight deformation, the data size is prevented from limitless increasing even for a complicated model.

The above object of the present invention can be achieved by providing the method with a function for defining both an absolute coordinate system and a floating coordinate system, a function for describing a relationship between the absolute coordinate system and the floating coordinate system, a function for defining a 3-dimensional cell array, a function for describing the correspondence between the floating coordinate system and the 3-dimensional cell array, and a function for converting the 3-dimensional cell array to a solid model.

Firstly, the present invention is characterized by a method or apparatus for describing a solid model existing in a 3-dimensional space with use of a bit-map, in which a plurality of different coordinate systems are provided with, and an area occupied by one of those different coordinate systems and part or whole of an area occupied by other coordinate systems are laid in layers.

Secondly, the present invention is characterized by a method or apparatus for describing a solid model existing in a 3-dimensional space, in which a fixed coordinate system is defined with respect to the 3-dimensional space, a single or a plurality of floating coordinate systems are defined, a relative positional relationship of each of the floating coordinate systems with the fixed coordinate system is described algebraically, a single or plurality of 3-dimensional cell arrays are defined, and the correspondence between the respective floating coordinate systems and the respective 3-dimensional cell arrays is described.

According to the present invention, therefore, it is possible to reduce the data size of a 3-dimensional bit-map and include feature-related information in the solid shape data while the merits of the three-dimensional bit-map data are kept as are.

Still another feature of the present invention is a solid body machining method or apparatus for transmitting shape data through a communication line to manufacture a real body according to the shape data; the shape data is described by the above solid shape describing method.

According to this feature, it is possible to provide a solid machining system that can reduce the transmission time of complicated three-dimensional CAD data.

Still another feature of the present invention is a solid shape data comparing method for making a comparison among a plurality of solid shape data items, which includes a data converting process for converting one of the plural of solid shape data items to a solid model described by the above solid shape describing method.

According to this feature, it is possible to make a comparison among a plurality of three-dimensional CAD data items using a small capacity of storage.

Still another feature of the present invention is a solid shape describing method that includes a floating coordinate system order defining function for defining an order among the plural of floating coordinate systems.

According to this feature, it is possible to determine whether a point exists inside or outside of the subject solid shape even when a plurality of coordinate systems are laid in layers and a voxel has different values for the same point.

Still another feature of the present invention is a solid shape displaying method that includes a function for displaying the external or cross-sectional view of a solid model described using the above solid shape describing method. The method obtains a priority level of each three-dimensional cell array by evaluating whether the array represents a global shape or local range shape of the solid model to display three-dimensional cell arrays in the order of their priority levels.

Still another feature of the present invention is a solid shape transmitting method that includes a function for transmitting the above solid model through a communication line, in which a priority level is determined for each of the plural of three-dimensional cell arrays by evaluating whether the array represents a global or local range shape of the solid model so that the three-dimensional cell arrays are transmitted in the order of their priority levels.

According to those methods, it is possible to display or transmit whole or marked part of a solid shape quickly.

Still another feature of the present invention is a solid shape data converting method for converting solid shape data to a solid model described using the above solid shape describing method, in which each of the plural of floating coordinate systems is defined according to the surface roughness, surface position deviation, surface element size, or surface curvature radius included in the solid shape data.

According to this feature, it is possible to convert three-dimensional CAD data to solid shape data described using the solid shape describing method of the present invention semi-automatically.

Still another feature of the present invention is an element defining function included in the above solid shape describing method, which can add an element characteristic attribute to the floating coordinate system or a voxel corresponding to the three-dimensional cell array.

According to this feature, it is possible to describe and operate a colored solid and/or a solid composed of various elements.

Still another feature of the present invention is a detailed description availability defining function included in the above solid shape describing method, which can add an attribute to the floating coordinate system or a voxel corresponding to the three-dimensional cell array, the attribute denoting whether or not another floating coordinate system describes the target solid shape more in detail.

According to this feature, it is possible to describe a solid shape in limitless accuracy and compare a solid shape with another in given accuracy.

Still another feature of the present invention is a CAD/CAM system for solid shapes, which includes a solid modeling unit for manufacturing a real body according to the original shape data and a solid measuring unit for measuring the real body. The CAD/CAM system corrects original shape data according to the measured data obtained by the solid measuring unit. The original data is described by the above solid shape describing apparatus.

According to this feature, it is possible to provide a CAD/CAM system for solid shapes, which can realize composite modeling by feeding back the measured data to the modeling data.

Still another feature of the present invention is a CAD/CAM system that includes a solid modeling unit for manufacturing a real body according to the original data and a solid measuring unit for measuring the real body. In the CAD/CAM system, the solid measuring unit determines a measuring procedure by referring to the original data described by the above solid shape describing apparatus.

Still another feature of the present invention is a function included in the solid measuring unit. The function changes a measurement resolution according to a size of a voxel included in the original data and corresponding to the three-dimensional cell array in the above solid shape describing apparatus.

According to those features, it is possible to provide a high precision CAD/CAM system for solid shapes, which can make measurement semi-automatically.

Still another feature of the present invention is a solid shape editing unit provided with a function for creating or changing the above solid model. The editing unit further includes displaying means for displaying the solid model and a function for displaying the above floating coordinate system and the solid model in layers.

According to this feature, it is possible to provide a solid shape editing unit that can convert three-dimensional CAD data to the solid shape data described using the solid shape describing method of the present invention.

Still another feature of the present invention is a solid shape editing method for displaying or transmitting the above solid model and selecting a method for determining the above priority level for the three-dimensional cell array from any of the following two methods; one of the methods sets a higher priority level for a global three-dimensional cell array and the other sets a higher priority level for a local three-dimensional cell array.

According to this feature, it is possible to provide a solid shape editing unit that can operate both of a solid shape in a wide range and a solid shape in a local range properly.

Still another feature of the present invention is a method employed by the machining unit in the above remote solid machining system. The method of the machining unit determines whether to refer to another floating coordinate system that describes the shape data more in detail according to the resolution of a machining tool.

According to this feature, it is possible to provide a solid machining system that can save the machining time while the required accuracy is assured.

Still another feature of the present invention is a function for selecting part or whole of measured data and a function for copying a selected portion of the measured data to the original shape data. The functions are included in the above CAD/CAM apparatus for solid shapes.

According to this feature, it is possible to provide a CAD/CAM apparatus for solid shapes, which can realize perfect reverse engineering by using measured data as modeling data.

Still another feature of the present invention is a medium for storing the above solid model.

According to this feature, it is possible to move/distribute the solid shape data described using the solid shape describing method of the present invention.

BEST MODE FOR CARRYING OUT THE INVENTION

While there are some engineering systems to be picked up as an embodiment of the present invention, all the effects of those engineering systems are obtained as a result of using the solid shape describing method of the present invention. It would thus appropriate to describe the solid shape describing method of the present invention here in prior to the description of those engineering systems.

Figure 1:
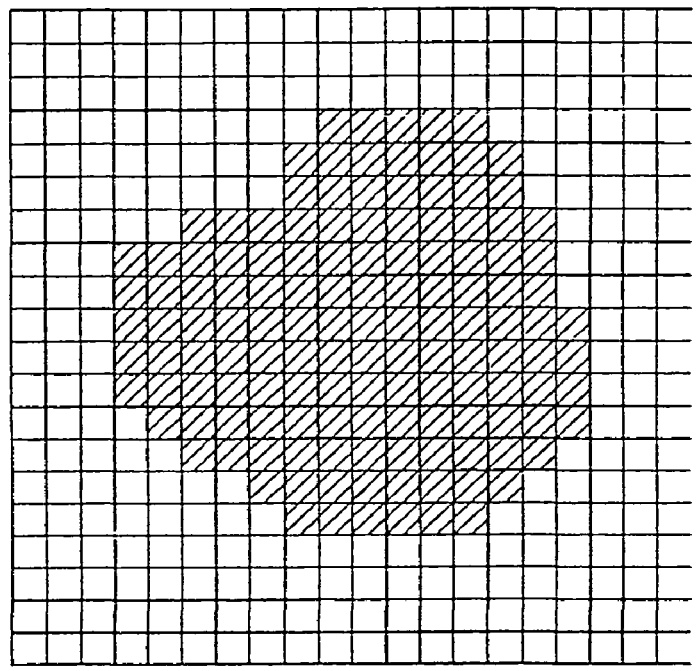
FIG. 1 is a solid shape described (a) using a conventional three-dimensional bit-map and a solid shape (b) described by the solid shape describing method of the present invention.
Figure 1:
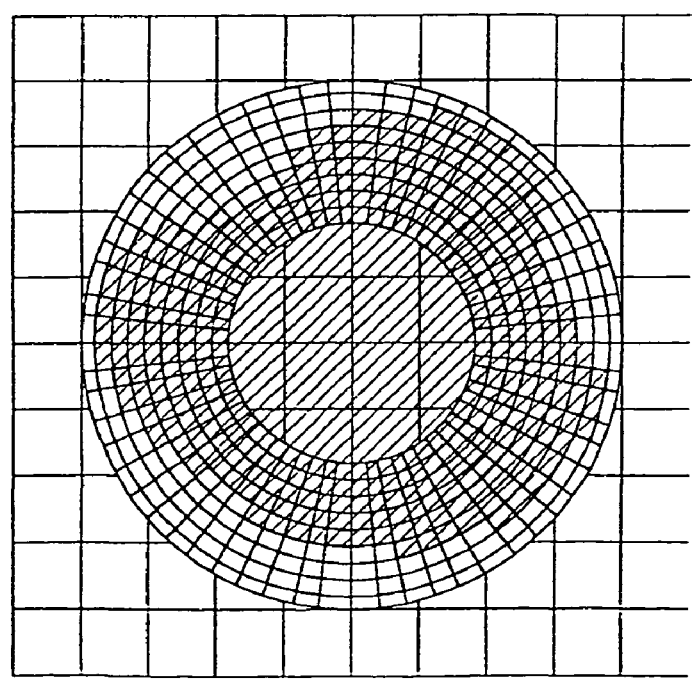

At first, FIG. 1(a) shows a solid shape described using a conventional three-dimensional bit-map and FIG. 1(b) shows a solid shape described using the solid shape describing method of the present invention. Both solid shapes (a) and (b) are originated from the same solid body. In the following description, some solid shapes are illustrated explanatorily as two-dimensional ones so as to make it easier to understand. Even in such cases, each actual body should be taken as a three-dimensional one.

As described above, FIG. 1(a) shows a solid shape described using a conventional three-dimensional bit-map. This method defines a grid that divides a three-dimensional space into many voxels. Each voxel includes information that denotes its center exists inside or outside the subject solid shape. In Fig. (a), each voxel, when about 50% or more of its capacity is inside the solid shape, is colored.

This method generates steps referred to as "jaggy" on the surface of the described solid shape. To reduce the "jaggy", the grid must be divided more finely. When the grid is divided more finely, however, the number of voxels increases, thereby the data size increases significantly. This is a substantial defect of the three-dimensional bit-map.

On the other hand, FIG. 1(b) shows a solid shape described using the solid shape describing method of the present invention. The solid shape is originated from the same solid body as that shown in FIG. 1(a). This method uses a plurality of coordinate systems and a grid is defined for each of the coordinate systems. In this case, two coordinate systems are used; a coarse grid defined orthogonal coordinate system and a fine grid defined polar coordinate system.

According to the solid shape describing method of the present invention as described above, therefore, it is possible to make each surface grid of a solid shape finer while each inside rough grid is kept as is, thereby the "jaggy" is reduced while the data size is suppressed from increasing.

Figure 2:
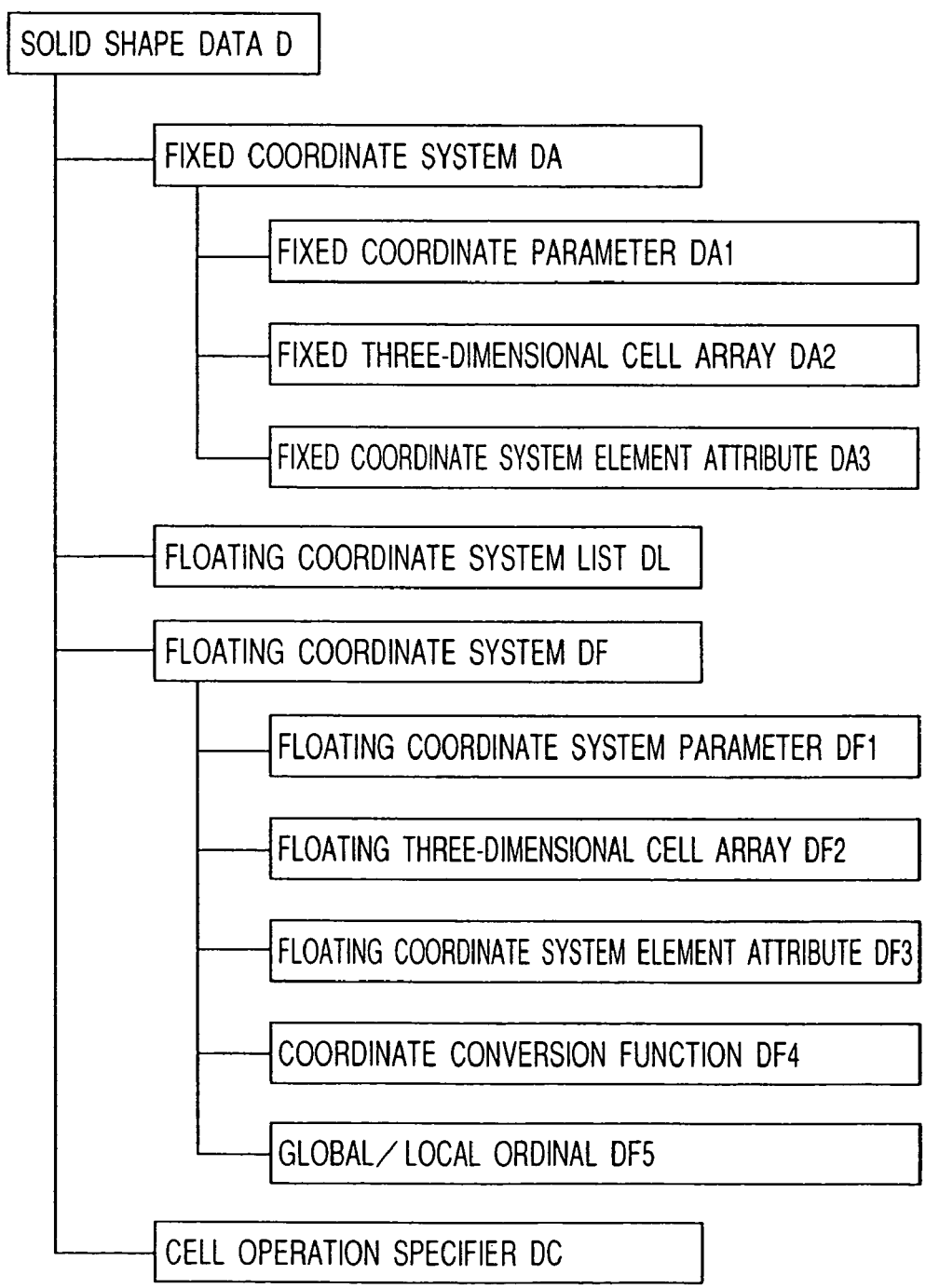
FIG. 2 is a data structure of solid shape data D described by the solid shape describing method of the present invention.

FIG. 2 shows a data structure of the solid shape data D described by the solid shape describing method of the present invention.

The solid shape data D includes a fixed coordinate system DA, a floating coordinate system list DL, and a cell operation specifier DC. The solid shape data D may include any number of floating coordinate systems DF or may not any.

Each of those coordinate systems may include a coordinate system parameter and a three-dimensional cell array respectively or may not any of them. The coordinate system parameter consists of three independent variables used to define a grid for dividing a three-dimensional space. The three-dimensional cell array is obtained by dividing a three-dimensional space by this grid. The fixed coordinate system DA may include a fixed coordinate system parameter DA1 and a fixed three-dimensional cell array DA2. The floating coordinate system DF may include a floating coordinate system parameter DF1 and a floating three-dimensional cell array DF2. Each cell includes information that denotes whether its center is inside or outside the subject solid shape.

The floating coordinate system list DL is used for managing the floating coordinate system DF. Each coordinate system may include one element attribute or may not any. The element attribute defines such characteristics as the color, surface roughness, light reflection rate, and density of each cell included in a three-dimensional cell array or solid shape described with coordinate systems.

Unlike the fixed coordinate system DA, a floating coordinate system DF includes a coordinate conversion function DF4 and a global/local ordinal DF5. The coordinate conversion function DF4 converts the floating coordinate parameter DF1 to a fixed coordinate parameter DA1. This conversion is described in the following format.

$$X=X(x, y, z)$$

$$Y=Y(x, y, z)$$

$$Z=Z(x, y, z)$$

The (X, Y, Z) is a fixed coordinate parameter DA1 and the (x, y, z) is a floating coordinate parameter DF1.

Figure 3:
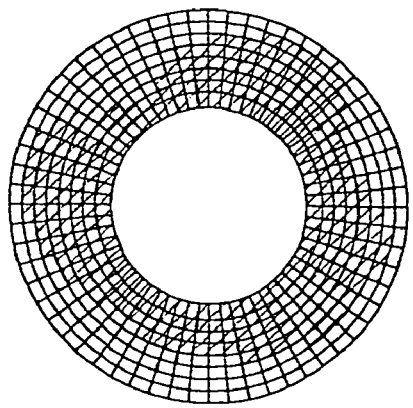
FIG. 3 is a relationship between a coordinate parameter/three-dimensional cell array/coordinate conversion function and a solid shape in the data structure of the present invention.

When a coordinate parameter/three-dimensional cell array/coordinate conversion function is given, a solid shape specific to the subject coordinate system is determined uniquely. FIG. 3 shows the relationship between them. Here, one polar coordinate system is picked up as an example of the floating coordinate system DF. The distance from the origin and the rotation angle from the Y axial direction are assumed as parameters r and θ. Both of r and θ are real numbers and have the following domains.

$$1 \leq r \leq 2$$

$$0 \leq \theta \leq 2\pi$$

A three-dimensional cell array uses r and θ as arguments. The array element is any of 0 and 1. When the element is 0, a voxel determined by r and θ exists outside the subject solid shape. When the element is 1, the voxel exists inside the solid shape. The three-dimensional cell array shown here includes 8 elements in the r direction and 60 elements in the θ direction. The top left element therefore corresponds to the following r and θ values.

$$r=1+1/16=1.0625$$

$$\theta=0+2\pi/120=\pi/60$$

When the number of elements in a three-dimensional cell array increases such way, the grid becomes finer.

The coordinate conversion function converts r and θ that are coordinate parameters specific to this floating coordinate system DF to absolute coordinate parameters, that is, X and Y that are fixed coordinate parameters DA1. As a result, a point (X, Y) having an absolute position comes to correspond to an element of the subject three-dimensional cell array.

The description will further continue with reference to FIG. 2.

The global/local ordinal DF5 denotes whether a floating coordinate system DF is a global or local one. Generally, the fixed coordinate system DA among a plurality of coordinate systems included in a solid shape data D is the widest range coordinate system. The global/local ordinal DF5 of the global floating coordinate system DF next to the fixed coordinate system DA is 1. The global/local ordinal DF5 increases as it goes closer to the local floating coordinate system DF. The global/local ordinal DF5 may be the same among a plurality of floating coordinate system DF.

Whether a point exists inside or outside the subject solid shape is determined by the value of the three-dimensional cell array of the coordinate system that includes the point. When the point is included in a plurality of coordinate systems, it is determined by the value of the three-dimensional cell array whose coordinate system has the largest value of the global/local ordinal DF5. When the global/local ordinal DF5 us the same among the plural of coordinate systems, the cell operation specifier DC, which specifies how to process the values of those three-dimensional cell arrays in such a case, handles the values as follows.

OR operation: The values of a plurality of three-dimensional cell arrays are ORed. A point that is regarded to exist inside the subject solid shape in a coordinate system is regarded finally to exist inside the solid shape.

AND operation: The values of a plurality of three-dimensional cell arrays are ANDed. A point that is regarded to exist inside the subject solid shape in all the coordinate systems is regarded finally to exist inside the solid shape.

MAJ operation: Whether a point exists inside or outside the subject solid shape is determined by the number of coordinate systems that regard the point to exist "inside" or the number of coordinate systems that regard the point to exist "outside", whichever is larger in number. When both coordinate system numbers are equal, a coordinate system with the smaller value of the global/local ordinal DF5 is referred for the decision.

The solid shape data D can include a limitless number of floating coordinate systems DF, so that it is possible to lay the floating coordinate systems DF in layers using the global/local ordinal DF5 and the cell operation specifier DC to define a limitlessly finer grid, thereby making the jaggy size smaller than a given limit threshold value.

Figure 4:
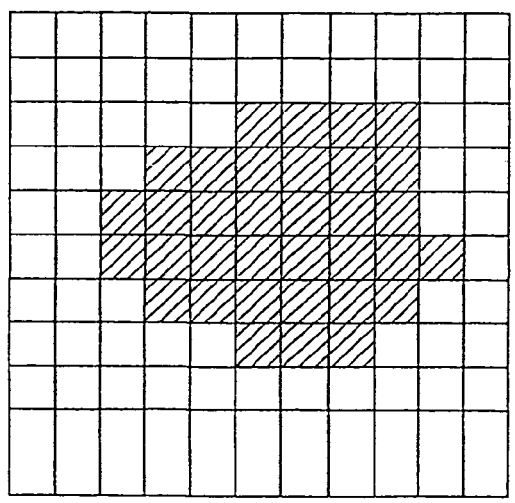
FIG. 4 is a change of a solid shape D to occur due to a difference between a global/local ordinal DF5 in a floating coordinate system DF of the solid shape data D of the present invention.
Figure 4:
Figure 4:
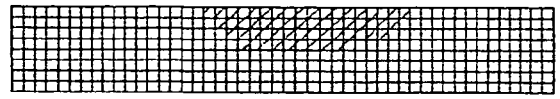
Figure 4:
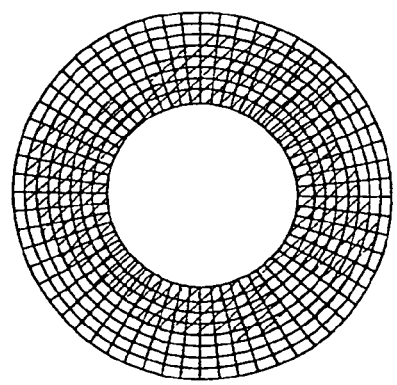
Figure 4:
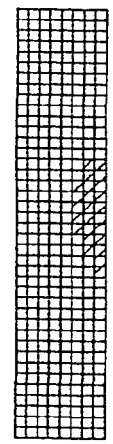
Figure 4:
Figure 5:
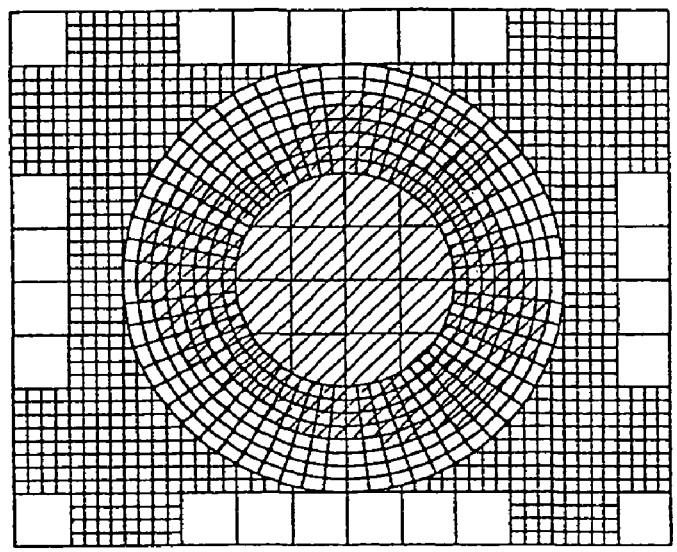
FIG. 5 is another change of the solid shape due to a difference between a global/local ordinal DF5 in the floating coordinate system DF of the solid shape data D of the present invention.
Figure 5:
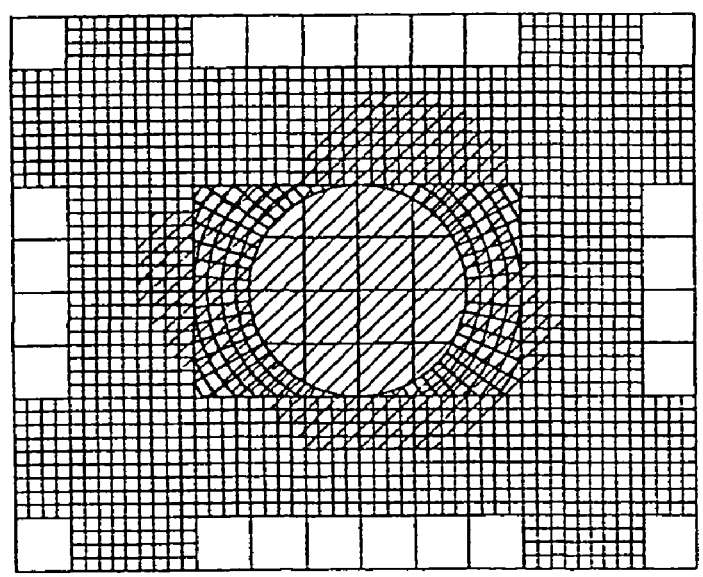
Figure 6:
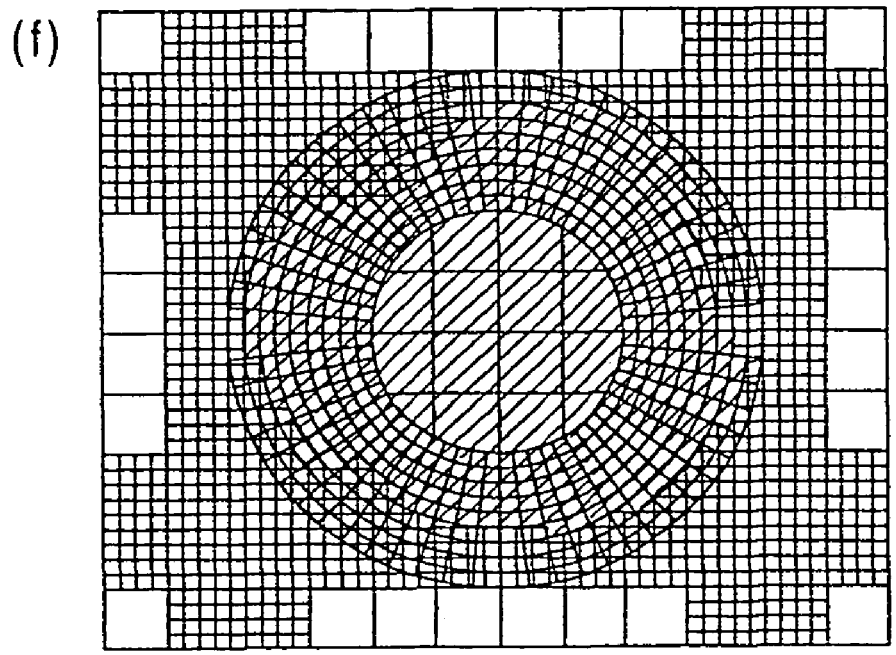
FIG. 6 is still another change of the solid shape to occur due to a difference between a global ordinal and a local ordinal DF5 in the floating coordinate system DF of the solid shape data D of the present invention.

FIGS. 4 through 6 show changes of a solid shape described using the solid shape data D of the present invention to occur due to the changes of the global/local ordinal DF5 in a floating coordinate system DF. FIG. 4(a) shows a fixed coordinate system DA and FIGS. 4(b) and (c) show two types of floating coordinate systems DF.

While the global/local ordinal DF5 of the fixed coordinate system DA is fixed at 0, any value can be specified for that of each floating coordinate system DF.

FIG. 4(d) through (f) show solid shapes, each being formed by a combination of their coordinate systems on each of the following conditions.

(d): global/local ordinal DF5 of (b)=1global/local ordinal DF5 of (c)=2
(e): global/local ordinal DF5 of (b)=2global/local ordinal DF5 of (c)=1
(f): global/local ordinal DF5 of (b)=1global/local ordinal DF5 of (c)=1cell operation specifier DC=OR operation Depending on which coordinate system three-dimensional cell array value is used, the solid shape changes. When consideration is taken for the reduction of jaggy, the global/local ordinal DF5 of each fine grid coordinate system should be set larger.

This completes the description of the data structure of the solid shape data D. Because of the data structure, the solid shape data D can have the following characteristics.

1. It can be determined at a given accuracy whether or not a plurality of solid shape data items D, when they use the same coordinate system definition, can describe the same solid shape respectively.
2. Any part of a solid shape described with the solid shape data D can be copied to another solid shape data D on the same coordinate system definition.
3. When a high accuracy is not required, the data size can be reduced by a simple calculation.
4. The accuracy can be improved limitlessly in proportion to an increase of the data size.
5. The less the deformation is made, the less the number of calculations is required for deforming a solid shape described by the solid shape data D.

The engineering system to be described below also uses the characteristics of the solid shape data D described by the solid shape describing method of the present invention.

FIRST EMBODIMENT

Figure 7:
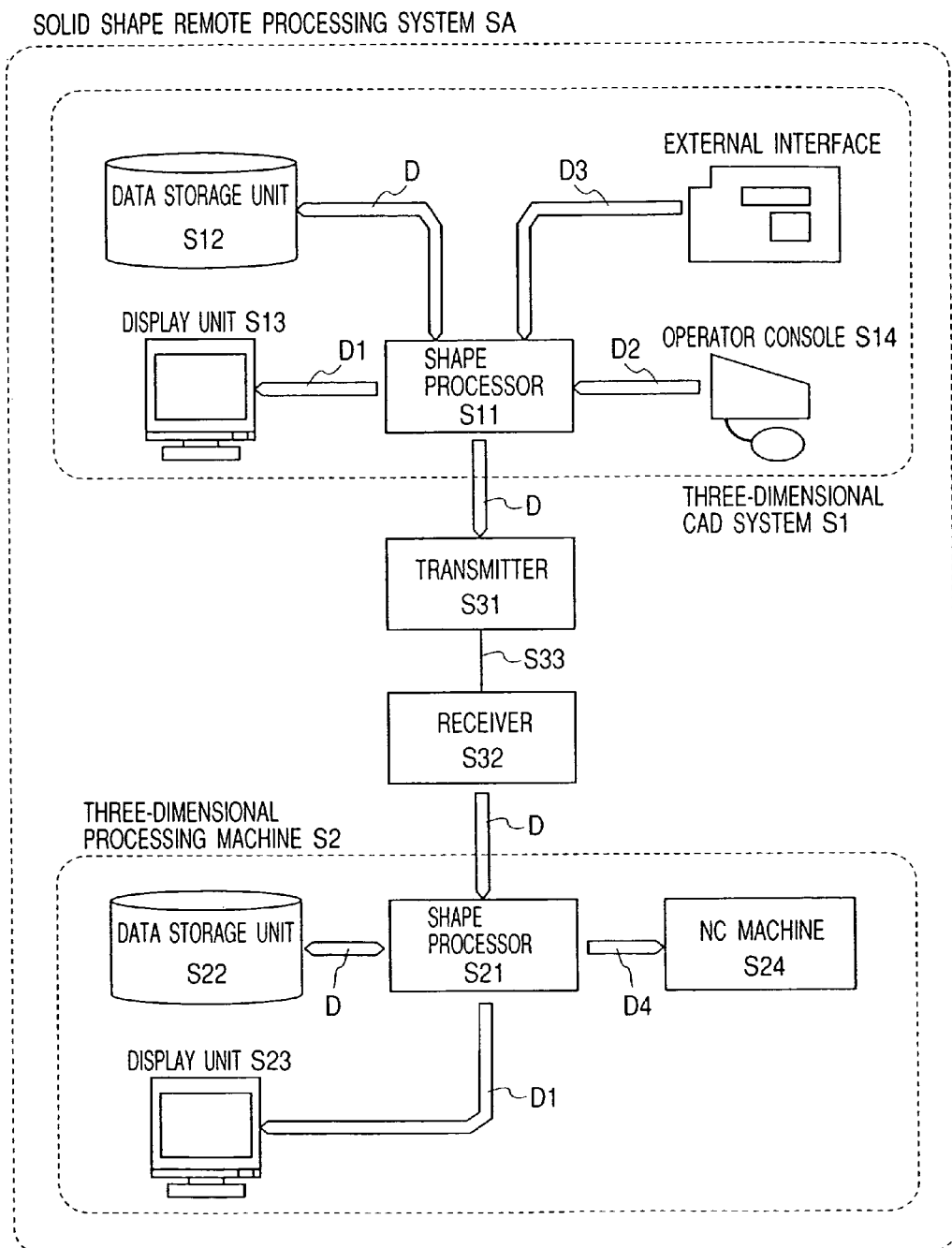
FIG. 7 is a block diagram of a remote solid machining system SA in the first embodiment of the present invention.

FIG. 7 shows a block diagram of a remote solid machining apparatus SA in the first embodiment of the present invention. The system SA includes a three-dimensional CAD apparatus S1 and a three-dimensional machining apparatus S2 that are connected to each other through a communication line S33.

The three-dimensional CAD apparatus S1 includes a shape processor S11, a data storage unit S12, a display unit S13, an operator console S14, and an external interface S15.

The shape processor S11 may be a personal computer or work station provided with a CPU, a memory, and programs and data stored in the memory. The shape processor S11, when receiving a command D2 from the operator console S14, executes the corresponding processing, such as creation, modification, correction, and comparison of the solid shape data D stored in the data storage unit S12, as well as such processing as changes of the data structure and inputs/outputs of data.

The data storage unit S12 may be a magnetic disk or semiconductor memory and used to store solid shape data D described by the solid shape describing method of the present invention.

The display unit S13 may be a CRT display or liquid crystal display. It displays solid shape data D and other design information as the display image D1.

The operator console S14 includes a mouse and a keyboard. The console S14, when receiving an input from the operator, sends the corresponding command D2 to the shape processor S11.

The external interface S15 may be a-LAN board or network adapter. It receives B-reps data D3 from another unit connected to the remote solid machining system SA.

Figure 8:
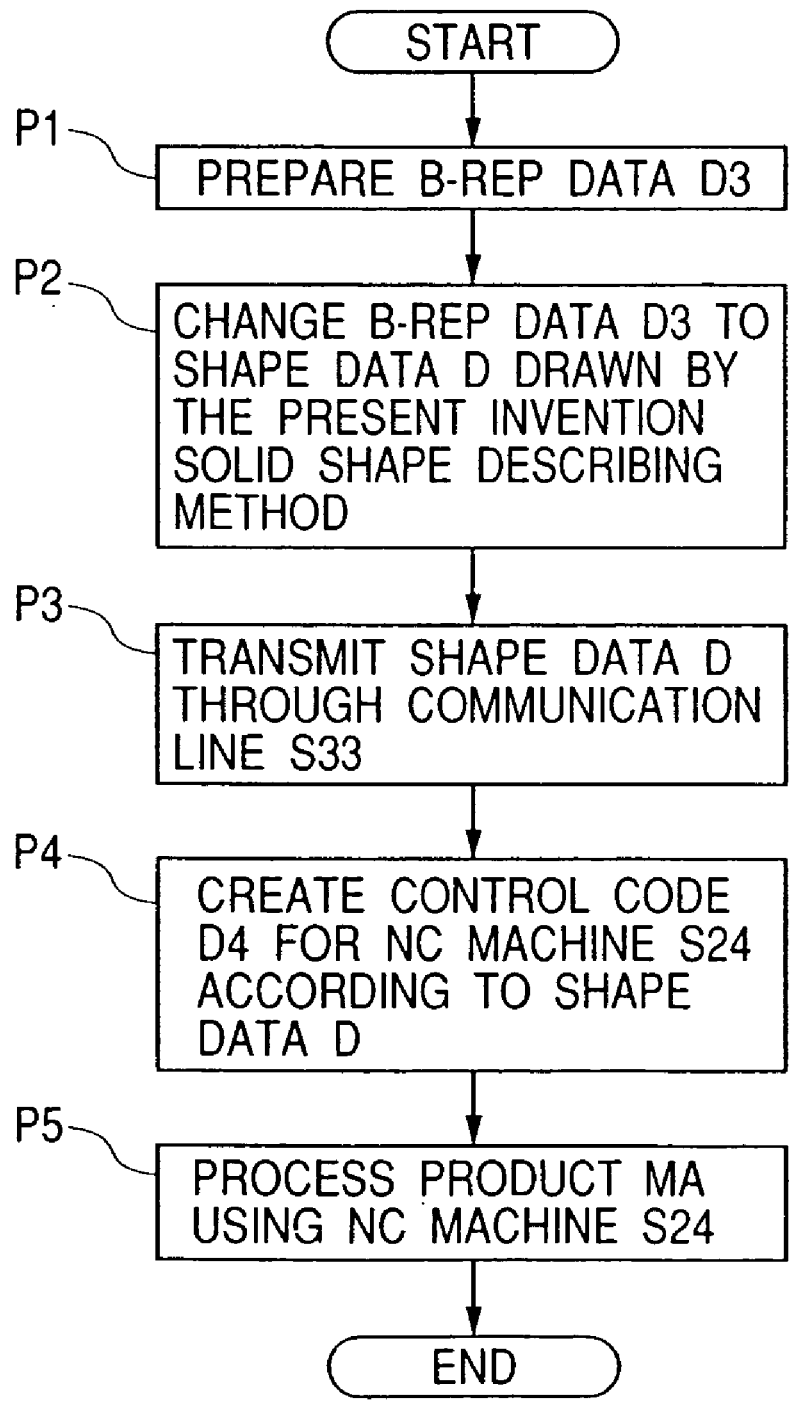
FIG. 8 is a remote solid machining process PA in the first embodiment of the present invention.

FIG. 8 shows a flowchart of the remote solid body machining process PA for manufacturing a product MA using the B-reps data D3 using the remote solid machining apparatus SA. The remote solid body machining process PA includes a B-reps data preparation process P1, a B-reps data conversion process P2, a data transmission process P3, a control code creation process P4, and an NC machining process P5.

The B-reps data preparing process P1 prepares B-reps data D3 used by a conventional general three-dimensional CAD. Another system provided with such a three-dimensional CAD apparatus is used to create B-reps data D3, then transfer the data D3 to the remote solid machining apparatus SA through the external interface S15. This is a practical method.

The B-reps data conversion process P2 describes a solid shape described with the B-reps data D3 using the solid shape describing method of the present invention so as to convert the B-reps data D3 to solid shape data D. When B-reps data D3 is used to describe a very complicated solid shape, the solid shape describing method of the present invention is effective to reduce the data size through this conversion, since the data size is the same.

The data transmission process P3 transmits solid shape data D from the three-dimensional CAD apparatus S1 to the three-dimensional machining apparatus S2 through the communication line S33.

The control code creation process P4 creates control codes D4 for the NM machine S24 according to the solid shape data D. So-called G codes may be used as those control codes D4.

The NC machining process P5 controls the NC machine S24 according to the control code D4 to manufacture the product MA.

Figure 9:
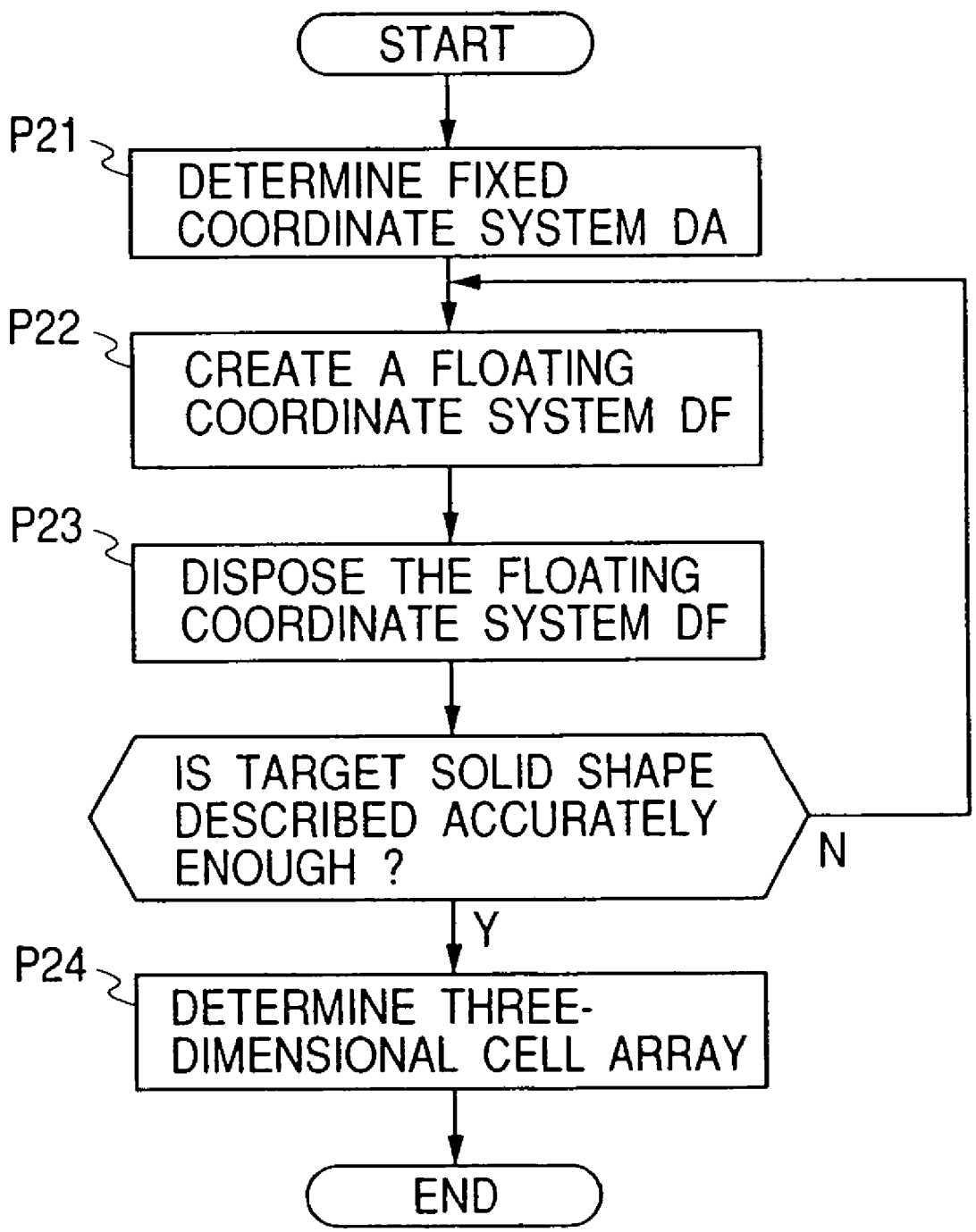
FIG. 9 is charts for describing a B-reps data conversion process P2 in the first embodiment of the present invention.

FIG. 9 shows the detailed B-reps data conversion process P2, which converts B-reps data D3 to solid shape data D. The B-reps data conversion process P2 includes a fixed coordinate system determination process P21, a floating coordinate system creation process P22, a floating coordinate system disposition process P23, and a three-dimensional cell array determination process P24.

The fixed coordinate system determination process P21 determines a fixed coordinate system DA. In other words, the process P21 determines an origin and a reference coordinate axis to determine a fixed coordinate parameter DA1. Ordinary B-reps data D3 includes the definitions of both origin and coordinate axis, so that they can be used as they are.

The floating coordinate system creation process P22 creates new floating coordinate systems DF. When creating a floating coordinate system DF for which none of the floating coordinate parameter DF1, the floating three-dimensional cell array DF2, and the coordinate conversion function DF4 is determined yet, the operator inputs a command D2 through the operator console S14. The floating three-dimensional cell array DF2 and the coordinate conversion function DF4 among them are determined in the floating coordinate system disposition process P23 and the three-dimensional cell array determination process P24, so that the operations up to the input of the floating coordinate parameter DF1 are executed in the floating coordinate system creation process P22.

Figure 10:
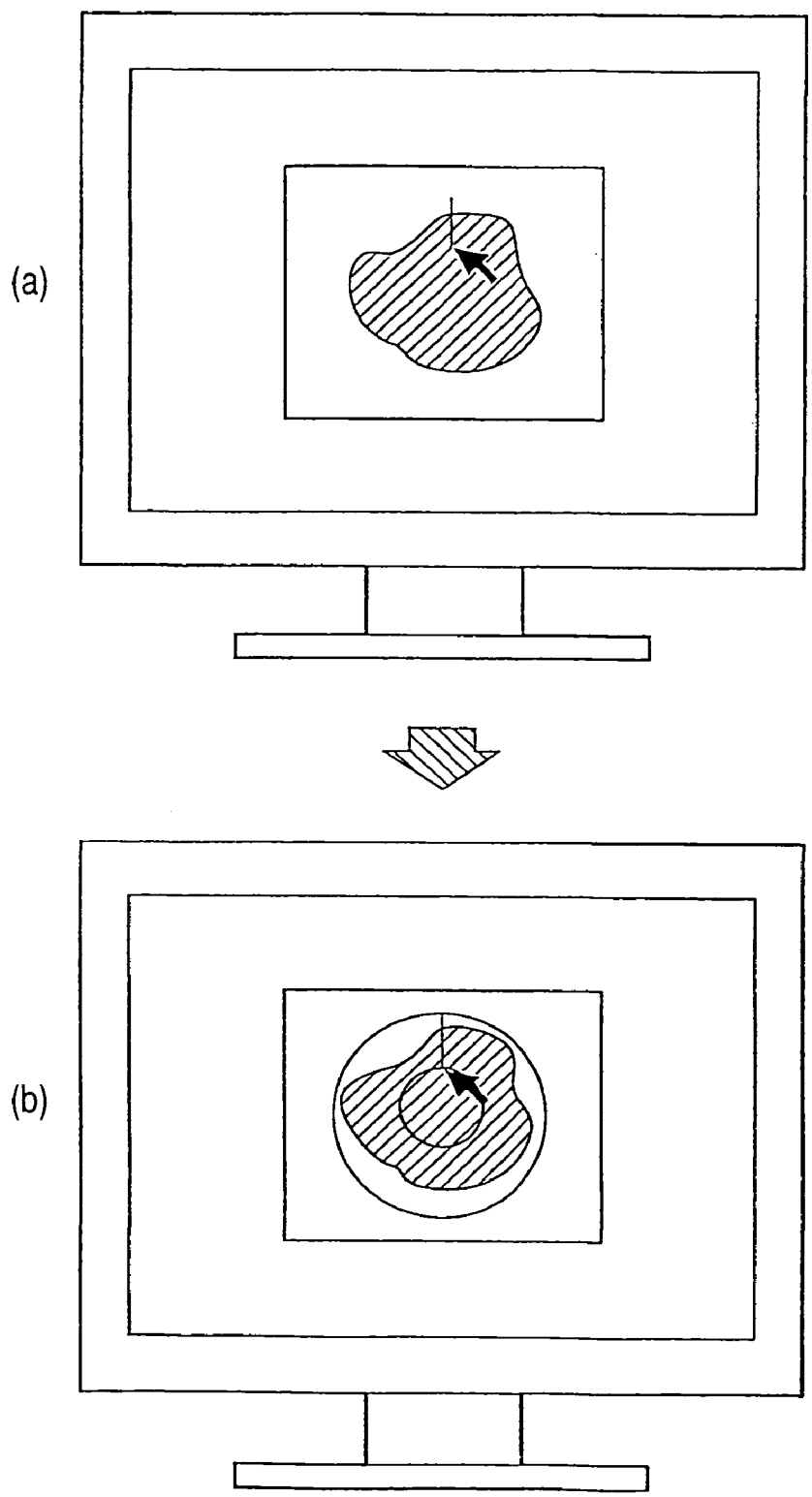
FIG. 10 is screens for displaying a floating coordinate system DF disposed in the first embodiment of the present invention respectively.

The floating coordinate system disposition process P23 determines the disposition of each floating coordinate system DF. Namely, the process P23 determines the coordinate conversion function DF4 for each floating coordinate system DF. FIG. 10 shows a screen of the display unit S13 for disposing a floating coordinate system DF. On the screen, a control point of a floating coordinate system DF is displayed together with B-reps data D3. The operator specifies the control point (an origin, end point, or the like) of a target coordinate system using the mouse and/or inputs the control point coordinates to dispose the floating coordinate system DF.

The three-dimensional cell array determination process P24 determines whether each voxel defined by the grid of a floating coordinate system DF exists inside or outside the subject solid shape described with the B-reps data D3, then substitutes a value for each element of the floating three-dimensional cell array DF2. Consequently, all of the floating coordinate parameter DF1, the floating three-dimensional cell array DF2, and the coordinate conversion function DF4 of the subject floating coordinate system DF are determined. Namely, the floating coordinate system DF comes to describe the subject solid shape.

When checking the solid shape data D received from the three-dimensional CAD apparatus S1 through a comparatively slow transfer rate communication line S33 on the display unit S23 of the three-dimensional machining apparatus S2, the operator may be able to check the coordinate systems included in the solid shape data D and display the coordinate systems in the order of the global/local ordinals DF5, that is, beginning at the widest range coordinate system. This method makes it possible for the operator to know the target solid shape roughly before receiving the whole solid shape.

Figure 11:
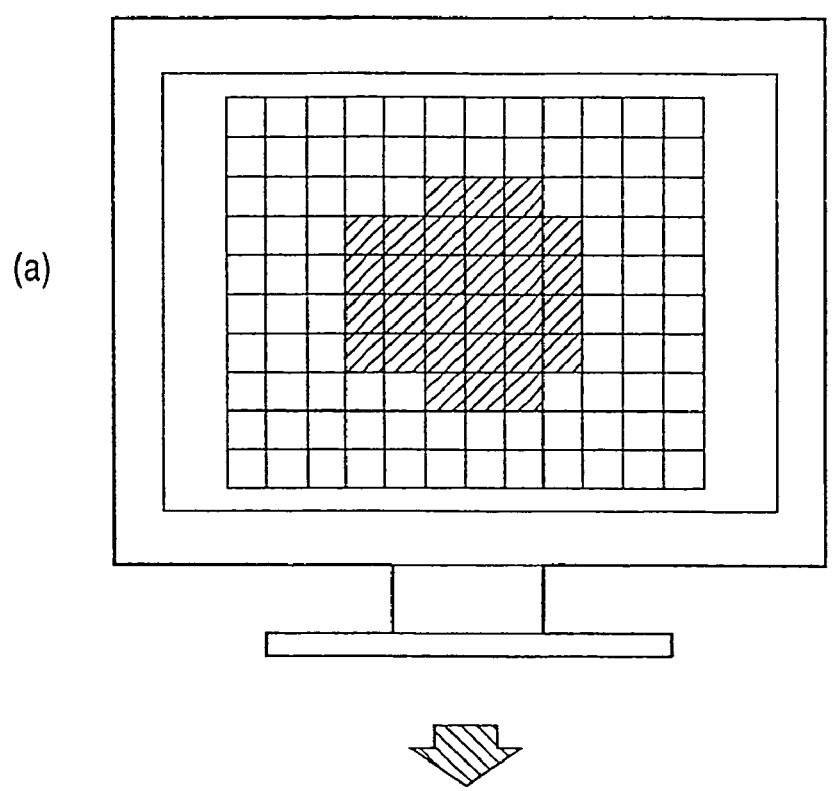
FIG. 11 is screens for displaying solid shape data D respectively.
Figure 11:
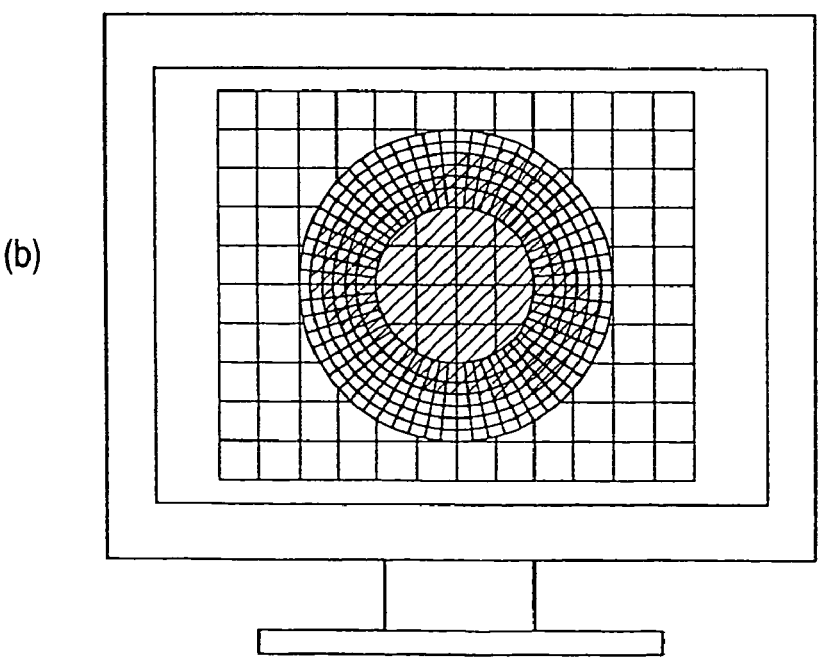

FIG. 11 shows a screen of the display unit S13 for displaying some solid shape data D using the above described method for displaying coordinate systems sequentially, beginning at the widest ranged one. The more the operator receives the solid shape data D, the more the solid shape is displayed in detail.

Figure 12:
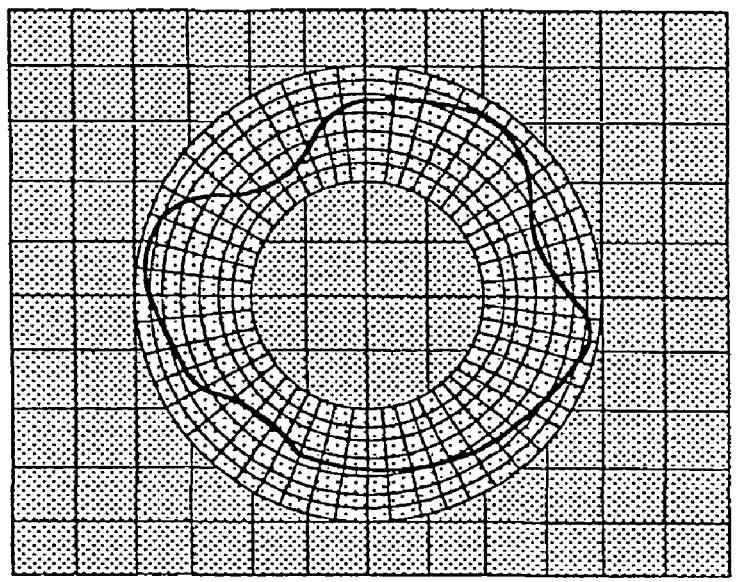
FIG. 12 is a procedure for machining a real body according to the solid shape data D using an NC machine S24.
Figure 12:
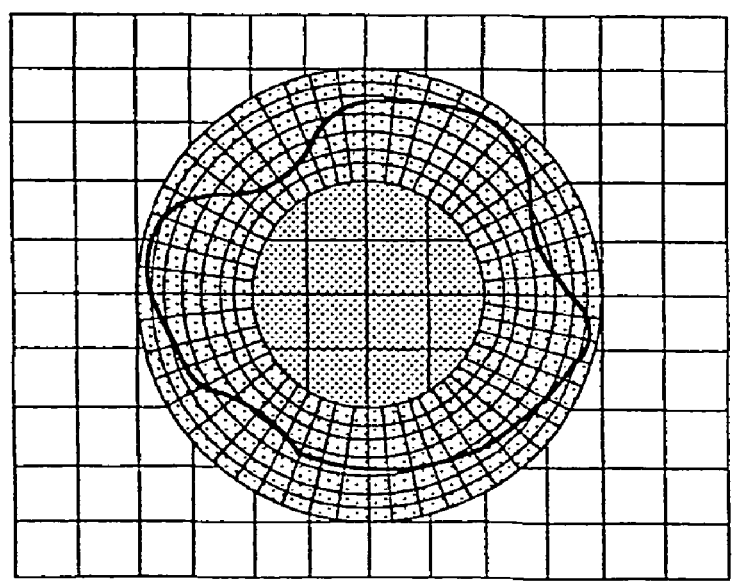
Figure 13:
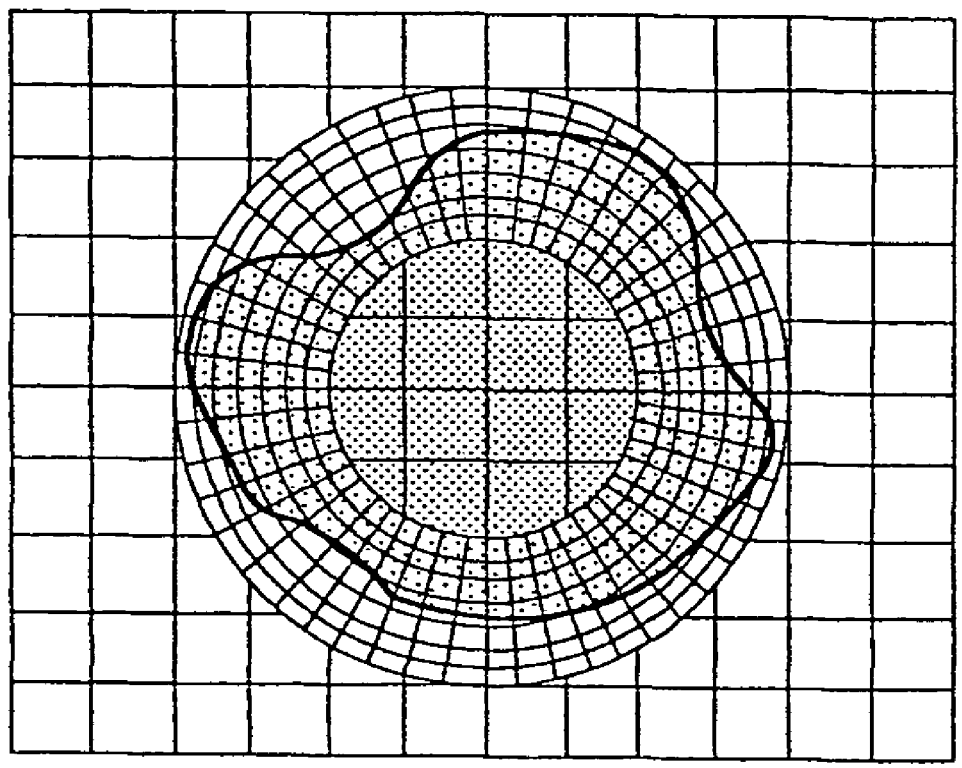
FIG. 13 is also a procedure for machining a real body according to the solid shape data D using the NC machine S24.

The data structure of the solid shape data D is advantageous even when a solid body is cut out by the NC machine S24 according to the data D. FIGS. 12 and 13 show a machining procedure for a solid body using the NC machine S24 according to the solid shape data D. In FIGS. 12 and 13, each element shape is described by a thick line and the target product MA shape is colored.

FIG. 12(a) shows an element that is not machined yet. At first, such a tool as an end mill is used to shave off an element portion whose solid shape is determined by the fixed coordinate system DA, that is, the element portion that is not included in the target solid shape, where no floating coordinate system DF is disposed. More concretely, the portion is equivalent to a voxel in which the element value of the fixed three-dimensional cell array DA2 is 0. This machining proceeds along the outer periphery of the floating coordinate system DF defined by a rough grid of the fixed coordinate system DA and a coordinate conversion function DF4. Consequently, a large diameter tool can be used to shorten the machining time. The element is thus machined into the shape shown in FIG. 12(b).

Then, the tool is replaced with a small diameter one to machine the element according to the floating coordinate system DF whose global/local ordinal DF5 is smaller next to that of the fixed coordinate system DA. The element is thus machined into the shape as shown in FIG. 13(c).

While the tools are changed just once to obtain the expected shape of the product MA in this example, the tool is replaced with a further smaller diameter one to machine the element more finely when another floating coordinate system DF with a larger global/local ordinal DF5 is disposed.

As described above, in a machining process of the solid shape data D, different diameter tools can be selected and used properly according to the grid fineness of the fixed coordinate system DA and each floating coordinate system DF, so that the machining can be made more accurately and quickly.

SECOND EMBODIMENT

Figure 14:
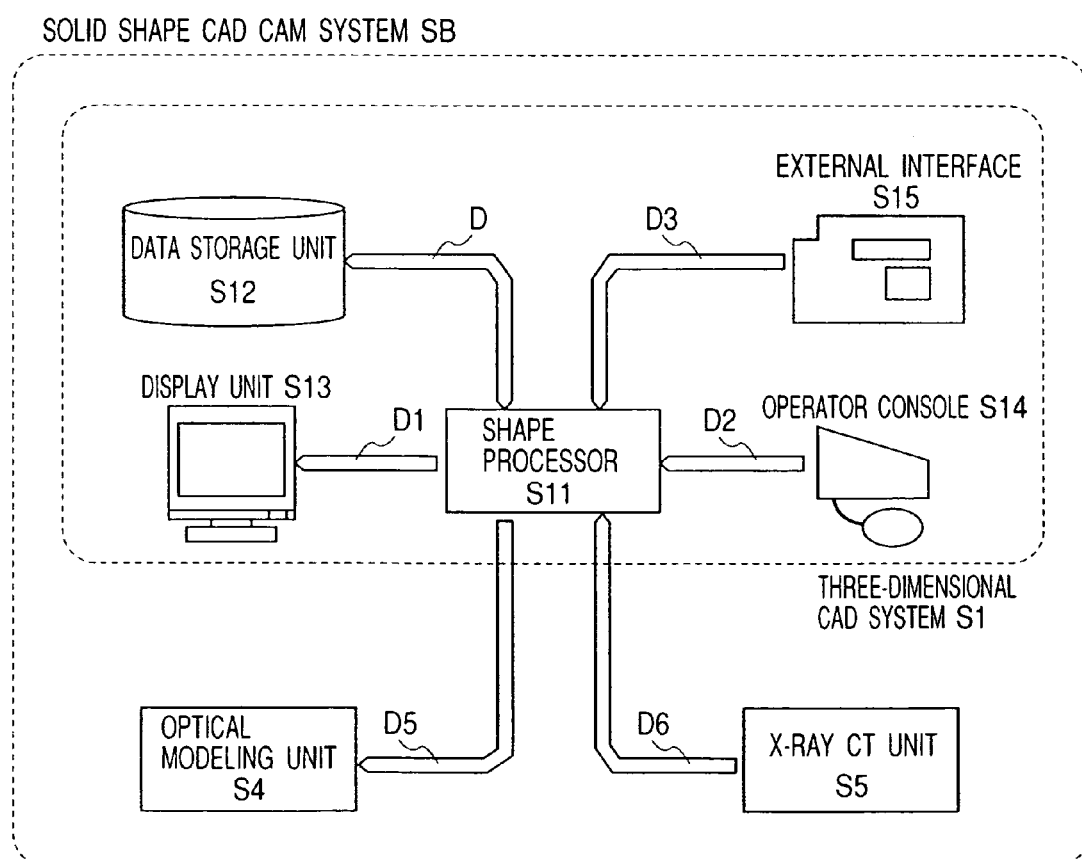
FIG. 14 is a block diagram of a CAD/CAM system SB for solid shapes in the second embodiment of the present invention.

FIG. 14 shows a block diagram of a solid shape CAD/CAM system SB in the second embodiment of the present invention. The solid shape CAD/CAM system SB includes a three-dimensional CAD apparatus 1, an optical fabrication unit S4, and an X-ray CT unit S5. The optical fabrication unit S4 and the X-ray CT unit S5 are connected to the three-dimensional CAD apparatus S1 respectively.

The three-dimensional CAD apparatus S1 is the same as that in the first embodiment.

The optical fabrication unit S4, when receiving a modeling data D4 described by the solid shape describing method of the present invention from the three-dimensional CAD apparatus S1, manufactures a real body having the solid shape with resin, etc. For the details of the optical fabrication technique, which is an operation principle of the optical modeling unit S4, refer to "Laminated Modeling System (Takeo Nakagawa, Yoji Marutani/KOGYO CHOSAKAI PUBLISHING CO., LTD.)

The X-ray CT unit S5 takes cross-sectional views of respective real bodies by shifting the cross-section little by little. Many cross-sectional views taken such way can be combined to obtain a real body solid shape. The solid shape is then described by the solid shape describing method of the present invention as measured data D6, which are then sent to the three-dimensional CAD apparatus S1. For details of the X-ray CT technique, which is an operation principle of the X-ray CT unit S5, refer to "Non-contact Measurement/Recognition Technical Data Book" (Optoronics co., ltd.).

Figure 15:
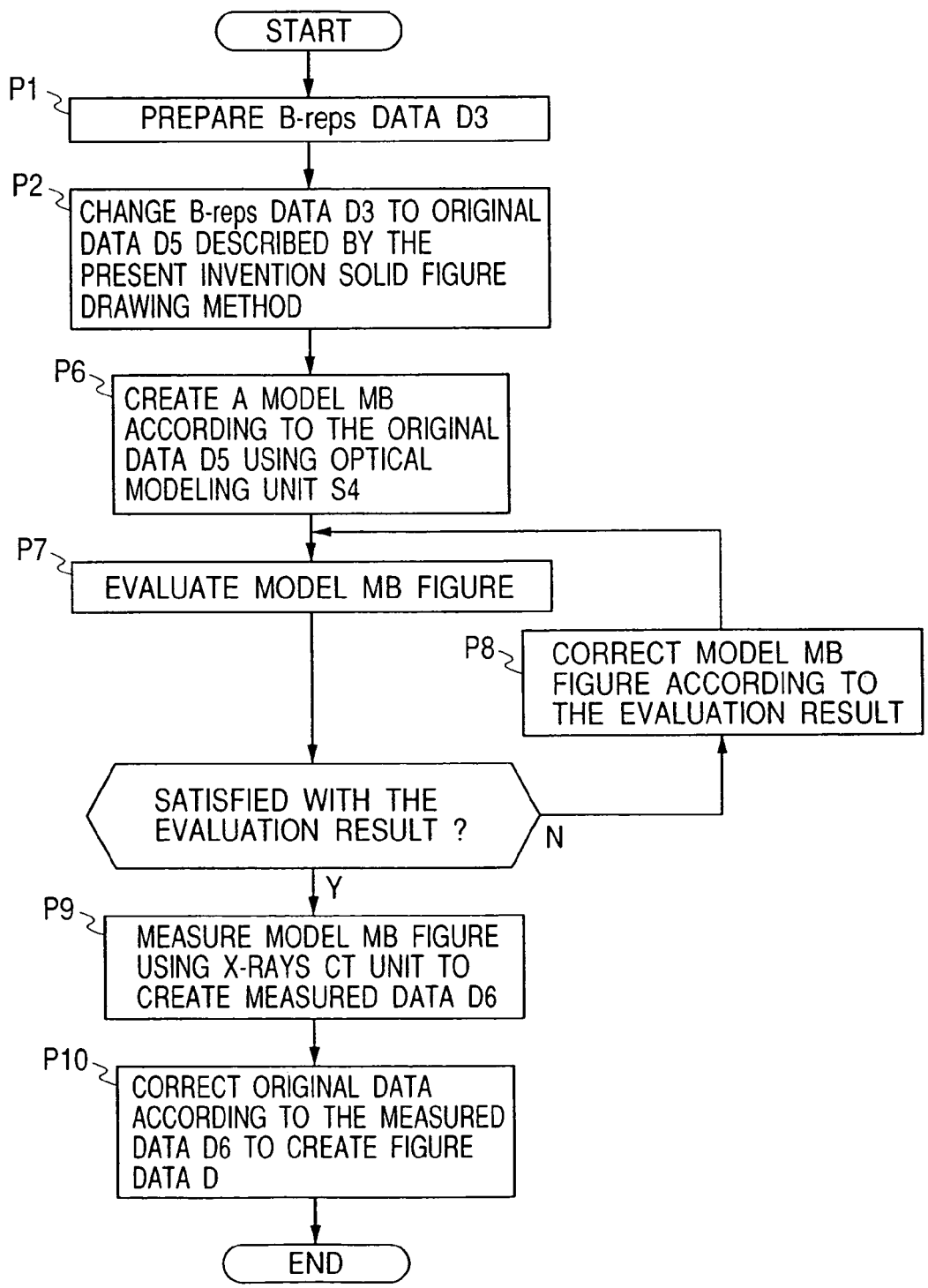
FIG. 15 is a solid shape designing process PA in the second embodiment of the present invention.

FIG. 15 shows a flowchart of the solid shape designing process, which is the second embodiment of the present invention. According to this second embodiment, it is possible to design any solid shapes from real body models MB quickly and accurately using the solid shape CAD/CAM system SB configured as described above. The solid shapes to be designed in this embodiment are, for example, those difficult to be designed only with a three-dimensional CAD apparatus, more concretely, those to be evaluated/optimized in accordance with sensitivity and those to be tested for evaluation/optimization. To achieve the above effect, the solid shape designing process PB shown in FIG. 15 includes a B-reps data preparation process P1, a B-reps data conversion process P2, a model manufacturing process P6, a model evaluation process P7, a model correction process P8, an original shape data correction process P9, a model measurement process P10, and a measured data reflection process P11.

The B-reps data preparation process P1 is the same as that in the first embodiment. The B-reps data conversion process P2 is also the same as that in the first embodiment.

The model manufacturing process P6 uses the optical fabrication unit S4 to manufacture the model MB having a solid shape described according to the original shape data D5. The accuracy for manufacturing the model MB can be set at 0.1 mm or under when a high accurate optical fabrication unit that uses epoxy resin is used.

The model evaluation process P7 can evaluate the shape of the model MB through visual and tactual senses of the evaluator by holding, coloring, and lighting the model MB or to make mechanical performance tests for the usage of the model MB.

The model correction process P8 machines the model MB to correct the solid shape. In the model evaluation process P7, the evaluator evaluates the shape of the model MB. When the model MB is not satisfied in the evaluation, the shape of the model MB is corrected by applying putty on and/or sticking another part to the MB. This correction is done more quickly and accurately than a method for correcting the solid shape data D, since it is done directly on the model MB.

After the correction of the model MB shape in the process P8, the model MB is returned to the model evaluation process P7 to be evaluated again. The operations in those processes are repeated until the model MB shape is optimized and finally the evaluator is satisfied.

The original shape data correction process P9 sends a command D2 to the shape processor S11 to correct the solid shape described with the original shape data D5.

Figure 16:
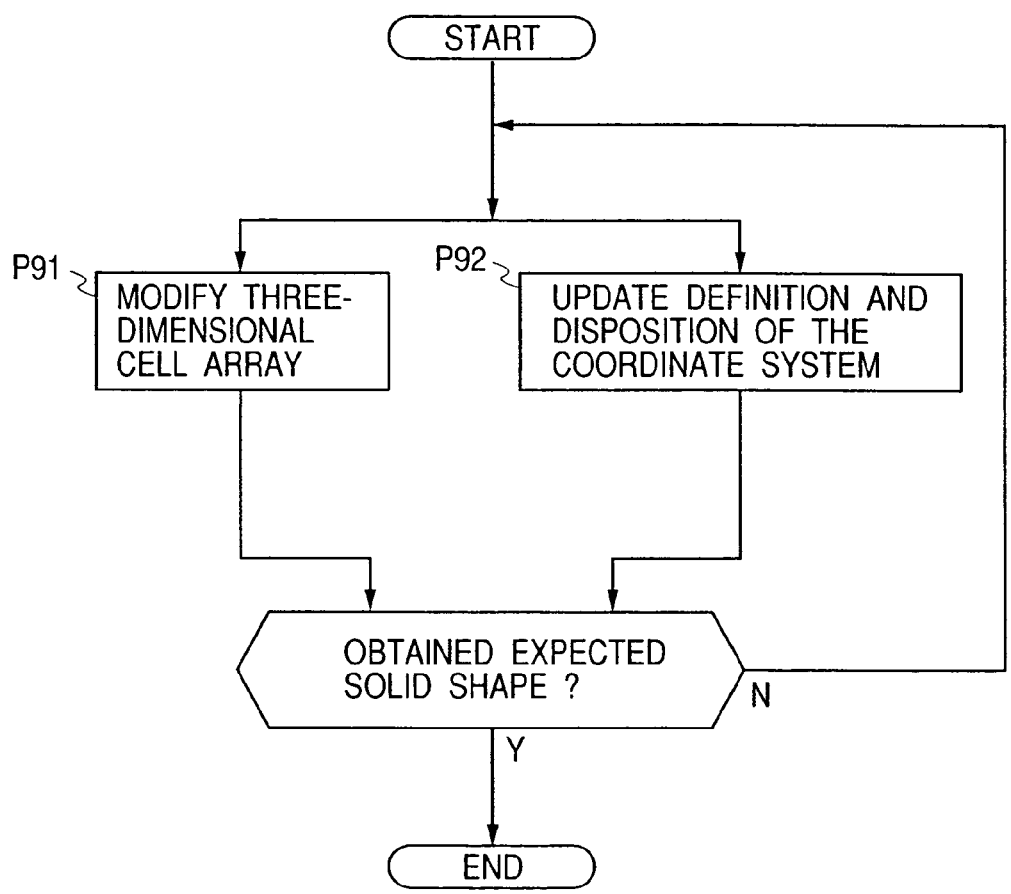
FIG. 16 is a detailed original shape data correcting process P9 shown in FIG. 15.

FIG. 16 shows details of the original shape data correction process P9 for correcting a solid shape described with the original shape data D5 to obtain a target solid shape. The process P9 includes a three-dimensional cell array change process P91 and a coordinate system change process P92.

The model measurement process P10 uses the X-ray CT unit S5 to measure the shape of the model M and create measured data D6. The shape of the model M can be measured at an accurate of 0.1 mm using an industrial X-ray CT unit that employs a high energy X-ray.

The measured data reflection process P11 compares the measured data D6 with the original shape data D5 so as to reflect the corrected solid shape on the original shape data D5. The most simple form of reflection is to assume the measured data D6 as the original shape data D5. When only part of a shape is corrected, part of the original shape data D5 is replaced with the corresponding measured data D6. In addition, when the original shape data D5 and the measured data D6 are compared with each other, the difference between them is displayed on the screen. The method is also effective.

According to the solid shape CAD/CAM system SB as described above, it is possible to link the "CAD modeling" with the "actual body modeling" closely so as to realize the "combined modeling" that employs the merits of both modeling methods. The "CAD modeling" designs a virtual solid shape using a three-dimensional CAD apparatus and the "actual body modeling" designs a realistic solid shape using the real body.

CAD modeling merits:
a. High modeling accuracy
b. Possible to defined numerically
c. Easy to be applied to CAM
d. Easy to be copied and reused
e. Easy to be retried
f. Easy to be transmitted and shared
g. No storage space required
h. None of manufacturing performance and working space required Actual body modeling merits:
i. Possible to make models by intuition
j. Modeling method selectable
k. Easy to use existing items
l. Much information usable
m. No special knowledge about CAD required
n. Possible to make quick changes of view points
o. Easy to evaluate the sense of touch
p. Possible to use it actually
q. No need to worry about VDT disease In other words, CAD modeling and actual body modeling can be employed selectively in accordance with the characteristics of the object body using the solid shape CAD/CAM system SB. Consequently, both of the design efficiency and the design quality can be improved.

THIRD EMBODIMENT

Figure 17:
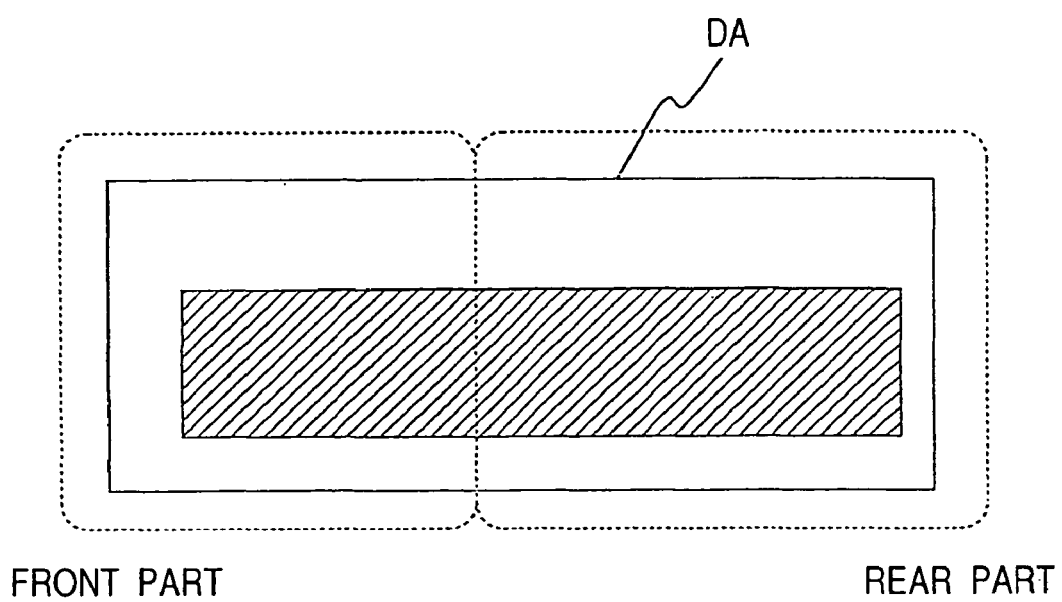
FIG. 17 is a shape of a railway vehicle original shape data D5 described by a solid shape describing method in the third embodiment of the present invention.

Next, a description will be made for the effects to be obtained by the solid shape CAD/CAM system SB of the present invention for designing a shape of a railway vehicle as the third embodiment of the present invention. FIG. 17 shows the original shape data D5 of the railway vehicle described by the solid shape describing method of the present invention. These original shape data D5 are created as a simple rectangular body using a three-dimensional CAD apparatus.

The following shapes must be determined in prior to the designing of the railway vehicle.

1. The shape of the front portion (where the driver's seat exists)
2. The shape of the rear external periphery (outer periphery of a passenger car)

Some coordinate systems are thus defined for the original solid shape data D5. At first, each floating coordinate system DF is defined so that its grid has a higher resolution than that of the fixed coordinate system DA. Then, a floating coordinate system DF is disposed at the front portion to be deformed delicately due to the sense of the designer, as well as at the rear outer periphery respectively where the cross sectional shape must be determined accurately. The designer then defines each coordinate system grid and disposes it manually while checking it on the screen of the display unit S13.

Figure 18:
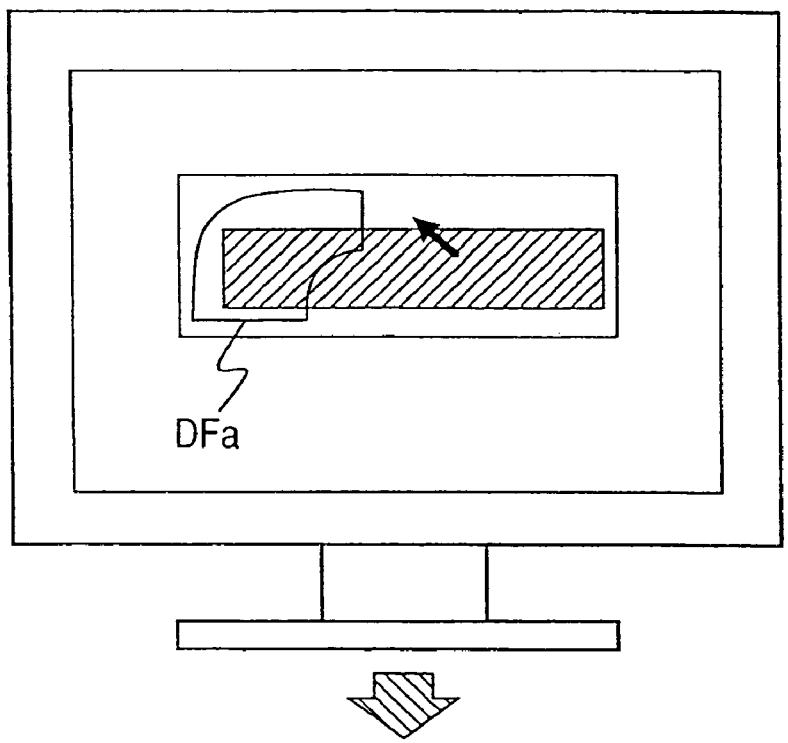
FIG. 18 is screens for displaying a floating coordinate system DF disposed in a railway vehicle design.
Figure 18:
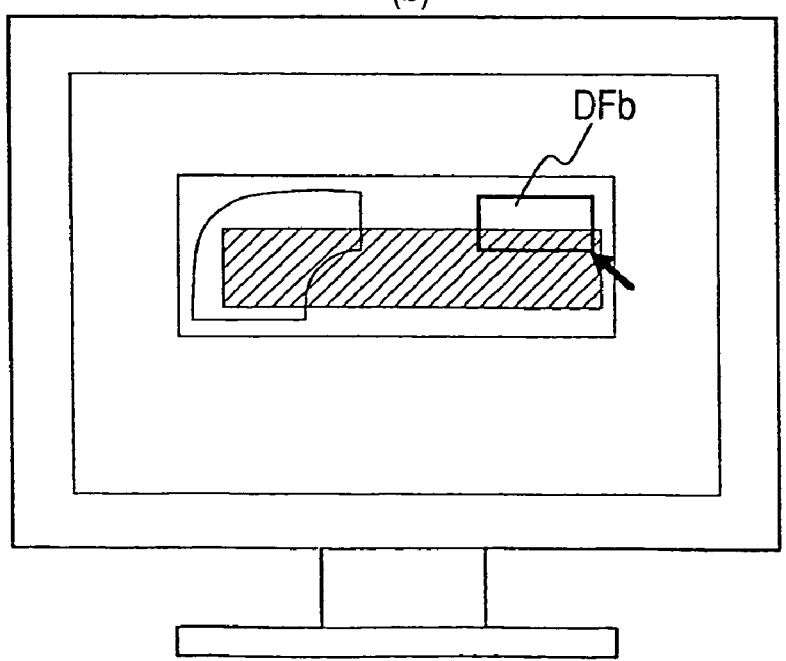

FIG. 18 shows such a screen of the display unit S13 for disposing a floating coordinate system DF using the mouse. The screen displays the original shape data D5 through volume rendering. The designer then creates some more new floating coordinate systems DF and specifies each control point (the origin, end points, etc.) with the mouse cursor and inputs its coordinates to dispose the coordinate system.

The three-dimensional CAD apparatus S1 is provided with a function for supporting the definition of each coordinate system. Generally, the more a solid shape is corrected finely, the more the surface element is reduced in size. When there are a plurality of solid shapes, the subject surface position is varied more at a frequently corrected portion. The three-dimensional CAD apparatus S1 makes most use of this to automatically find each finely corrected portion and/or portion to be corrected frequently and disposes a high resolution grid around the portion. The designer can also correct the disposition of the automatically disposed grid manually as described above.

Then, the designer sends another command D2 to the three-dimensional CAD apparatus S1. Thus, a fixed three-dimensional cell array DA2 and a floating three-dimensional cell array DF2 are created automatically from the designed solid shape, thereby the original shape data D5 described by the solid shape describing method of the present invention is obtained. This original shape data D5 includes not only the fixed coordinate system DA, but also two floating coordinate systems DF that are a front portion coordinate system DFa and a rear portion coordinate system DFb.

There are two methods for correcting the original shape data D5 described by the solid shape describing method of the present invention. One of the methods is used to describe a three-dimensional shape and modifying the three-dimensional cell array directly. The solid shape can thus be corrected directly.

Figure 19:
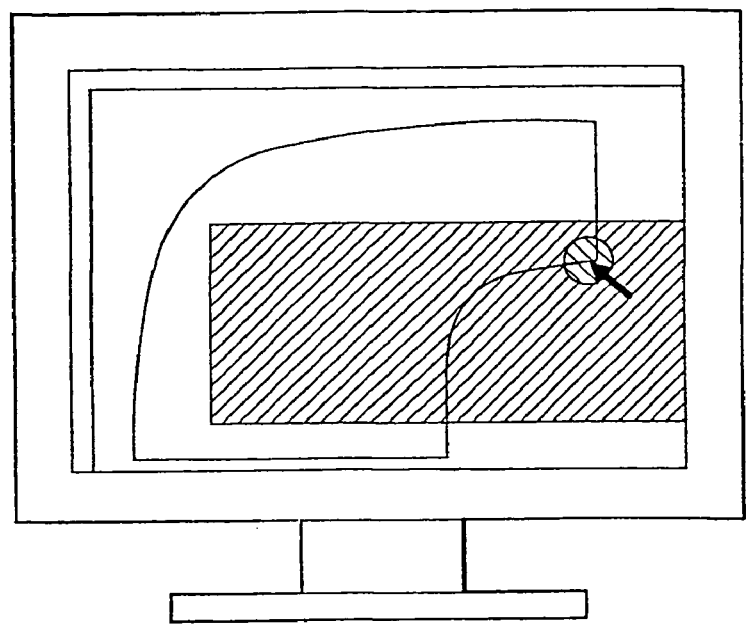
FIG. 19 is screens for describing a three-dimensional shape to correct the original shape data D5 described by the solid shape describing method of the present invention.
Figure 19:
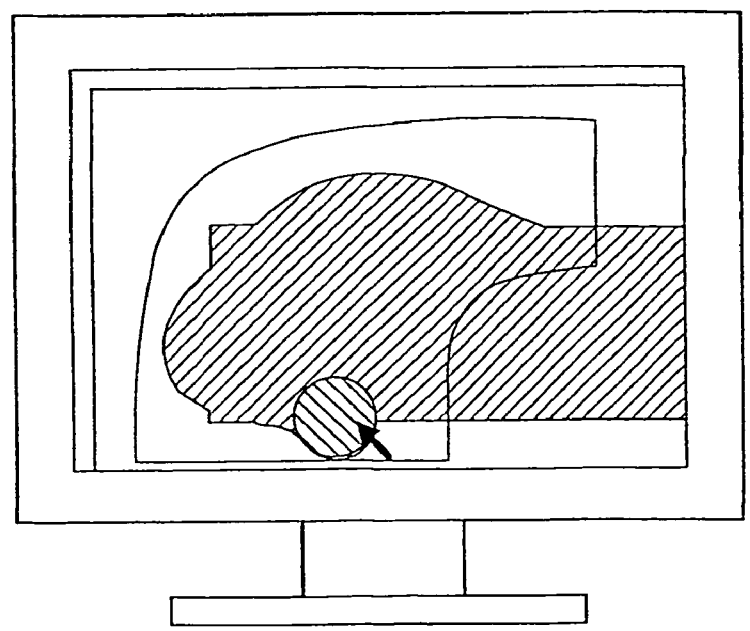

FIG. 19 shows a screen of the display unit S13, displayed for correcting the original shape data D5 using the method. In this example, a virtual ball-like describing tool is dragged with the mouse to correct the solid shape. When a describing operation is done, the three-dimensional cell array of the front portion coordinate system DFa is modified. When the operation ends, the modification is reflected automatically in another coordinate system having a global/local ordinal DF5 smaller than that of the above three-dimensional cell array of the front portion coordinate system DFa.

Another method is used to define the grid of each coordinate system and change the disposition of the coordinate system. This method enables such operations as parallel movement, rotational movement, symmetrical movement, expansion, compaction, and copying to be made accurately.

Figure 20:
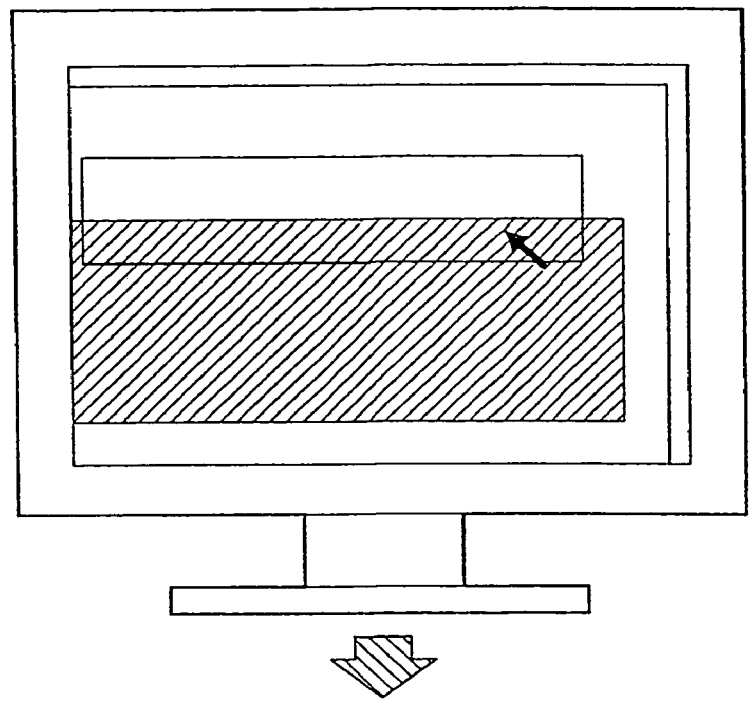
FIG. 20 is screens for changing a definition of a grid in a coordinate system and/or disposition of a coordinate system to correct the original shape data D5 described by the solid shape describing method of the present invention.
Figure 20:
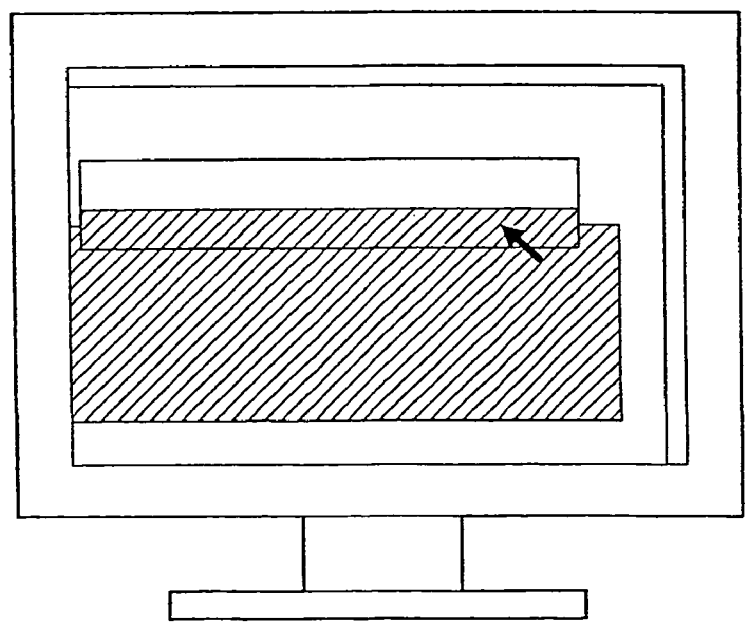

FIG. 20 shows a screen of the display unit S13, displayed for correcting the original shape data D5 using this method. In this example, the rear portion cross sectional coordinate system DFb is dragged by the mouse cursor to correct the target solid shape. In a move operation, at first the rear portion coordinate system DFb is modified, then the modification is reflected automatically in another coordinate system having a smaller global/local ordinal DF5.

This method, when used to make a local correction, comes to be different from that in the first embodiment; the coordinate systems must be displayed in the descending order of global/local ordinals DF5, beginning from the widest range one. Namely, a local coordinate system is displayed first. According to this method, the whole original shape data D5 is not displayed each time the operator corrects the shape. The modification result of the shape is thus displayed immediately on the screen, thereby the local correction is done quickly.

The original shape data D5 can have an element attribute. The designer can input and operate the fixed coordinate system element attribute DA3/floating coordinate system element attribute DF3 through the three-dimensional CAD apparatus S1.

Figure 21:
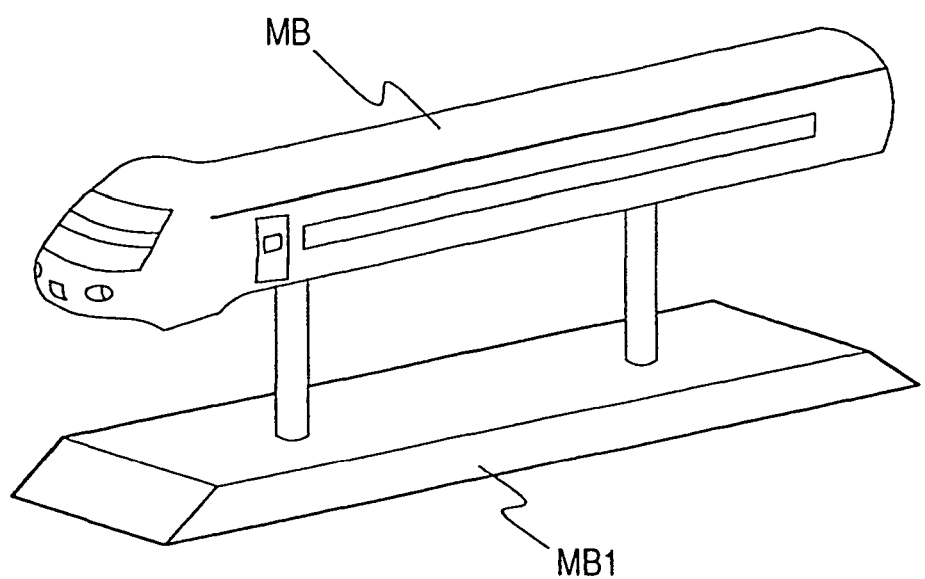
FIG. 21 is a shape of a model MB created in the third embodiment of the present invention.

The original shape data D5 created as described above is sent to the optical modeling unit S4, thereby the model MB having this solid shape is created automatically. FIG. 21 shows the shape of the model MB. The model MB is provided with a foot part MB1 that makes it easy to position the model MB to be attached to the X-ray CT unit S5.

The designer then performs a wind-tunnel test for the model MB to evaluate the aerodynamic characteristics of the model MB. A railway vehicle, when running at a high speed, generates a turbulence and this turbulence causes noise. In addition, to suppress the power consumption, the air resistance of the model MB must be minimized. The designer, when recognizing an occurrence of a turbulence and/or an excessively large air resistance by the wind-tunnel test, can correct the shape by shaving the model MB partially and/or apply some putty on it. The direct correction of the real body by an experienced designer in wind-tunnel tests can often be done more quickly and accurately than the correction of the original shape data D5 by the three-dimensional CAD apparatus S1.

After the evaluation of the aerodynamic characteristics, the designer evaluates the external appearance of the model MB from every direction by coloring and checking the model MB. At this time, the designer can make the evaluation more accurately by intuition using the real body model MB than the evaluation of the external appearance only by checking the original shape data D5 on the screen of the display unit S13. If any thing is not satisfied with the model MB, the designer can shape the model MB again by shaving and/or applying some putty on it. If the shape is changed significantly, another aerodynamic test should be performed.

When the solid shape is optimized after the evaluation of both aerodynamic characteristics and external appearance of the model MB, the designer sets the model MB in the X-ray CT unit S5 to measure the solid shape. At this time, the designer sends a command to the three-dimensional CAD apparatus S1 and the original shape data D5 of the model MB to the X-ray CT unit S5. The original shape data D5 includes a plurality of coordinate systems, each having a resolution different from others, so that the X-ray CT unit S5 can select proper cross section intervals to be photographed in accordance with each of the coordinate systems. The measurement time can thus be saved. The designer can also obtain the measured data D6 having the same data structure as that of the original shape data D5 by processing each cross-sectional image obtained in accordance with the data structure of the original shape data D5. When the original shape data D5 has an element attribute, the attribute is copied to the measured data D6, thereby the designer can omit the input of the element attribute of the measured data D6.

The measured data D6 can be used as new original shape data D5. It is also possible to compare data D6 with the data D5 to correct the original shape data D5.

For a railway vehicle, the rear part of the front portion keeps the same cross sectional shape, which is a so-called extruded shape. For the measured data D6 of the model MB, that rear part cannot always be given the extruded shape due to an error to occur in the measurement even when no other portion except for the front portion is transformed. To give that part the extruded shape, therefore, the original shape data D5 is used partially or the measured data D6 must be corrected strictly into the target extruded shape. According to the method of the present invention, it is easy to make such an extruded shape strictly by obtaining one cross section, then copying it to every cross-section by making good use of the horizontal axis of the grid of the coordinate system DFb located at the rear part cross section.

Railway vehicles are symmetrical in shape at most of their portions. However, the symmetry might not be kept strictly in manual deformation of the model MB. To secure the symmetry strictly, the solid shape described with the measured data D6 is divided into symmetrical two parts, then the average value must be calculated by measuring how much each of the parts is deformed. According to the method of the present invention, it is easy to divide a solid shape into symmetrical two parts by copying both of the coordinate system DFa of the front portion and the coordinate system DFb of the rear cross-sectional portion, then turning them over at the center plane, then adding the result to the measured data D6.

When part of the measured data D6 is added to the original shape data D5, part of the measured data D6 is duplicated and used, the two measured data items D6 are compared, and the average value of the two measured data items D6 is obtained, therefore, the solid shape describing method of the present invention is very effective to make it easy to do the operations.

The method is also effective for machining products using an NC cutting machine, although the above example of the railway vehicle is not suitable for an example of the following case. When a product must be cut using a small precision cutter, the cutting is done only at a portion defined by a floating coordinate system, so that other portions can be cut quickly using a large cutter. Namely, the cutting and machining time can be reduced significantly.

For the solid shape CAD/CAM system S, which is provided with an optical fabrication unit S4 and an X-ray CT unit S5, those components are not always required. Those components can be replaced with others having similar functions. For example, the optical fabrication unit S4 can be replaced with such a rapid prototyping unit as an SLS modeling unit/LOM modeling unit/FDM modeling unit. The unit S4 can also be replaced with a 3/5-axis NC machine. Those units may also be used to create a wax pattern to cast a vanishing model.

A rapid prototyping unit that can paint shaped articles will make it possible to create models MB painted automatically using the fixed coordinate system element attribute DA3 and the floating coordinate system element attribute DF3. The element attributes will make it possible to use only a specific element portion for creating a model MB.

The X-ray CT unit S5 may be replaced with an optical cutting type measuring unit and/or a probe type measuring unit. A plurality of measuring methods may also be combined. A photographic measuring unit makes it possible to reflect any painted color of the model MB on the fixed coordinate system element attribute DA3/floating coordinate system element attribute DF3.

As described above, according to the present invention, it is possible to provide a solid shape describing method that enables shape data to include feature-related information and the shape data to be reduced in size while features of the subject three-dimensional bit-map are kept as are, as well as to provide an engineering system that employs the method. The features of the three-dimensional bit-map are, for example, that the same data is always assumed for the same shape, the data structure is kept at a slight deformation, the data size is prevented from a limitless increase even for a complicated shape.

The invention claimed is:

1. An engineering system for describing a subject solid shape existing in a three-dimensional space with use of a three-dimensional bit map having a cell comprising:
   a grid that divides said three-dimensional space into a plurality of cells wherein each of said cells includes information that denotes whether its center exists inside or outside the subject solid shape,
   a solid shape describing apparatus provided with a memory for storing programs;
   a data storage unit;
   a display unit; and
   a plurality of functions provided by the programs, said functions comprising:
   a function for receiving a definition of a plurality of different coordinate systems to said solid shape described by the three-dimensional bit-map;
   a function for receiving a definition that an area where each inside grid of said solid shape is described by one of said plurality of different coordinate systems overlaps with a part or whole of an area where each surface grid of said solid shape is described by another coordinate system; and
   a function for converting said three-dimensional bit-map to its solid shape data with use of said defined plurality of different coordinate systems and displaying said solid shape according to said solid shape data on the display unit.

2. A method for describing a subject solid shape existing in a three-dimensional space with use of a three-dimensional bit map having a cell comprising:
   defining a grid that divides said three-dimensional space into a plurality of cells wherein each of said cells includes information that denotes whether its center exists inside or outside the subject solid shape;
   receiving a definition of a plurality of different coordinate systems to said solid shape described by the three-dimensional bit-map;
   receiving a definition that an area where each inside grid of said solid shape is described by one of said plurality of different coordinate systems overlaps with a part or whole of an area where each surface grid of said solid shape is described by another coordinate system; and
   converting said three-dimensional bit-map to its solid shape data with use of said defined plurality of different coordinate systems and displaying said solid shape according to said solid shape data on the display unit.

* * * * *